(12) United States Patent
Ohtani

(10) Patent No.: US 8,571,414 B2
(45) Date of Patent: Oct. 29, 2013

(54) OPTICAL TRANSMISSION DEVICE, TRANSMISSION AND RECEPTION MODULE, OPTICAL TRANSMISSION SYSTEM, AND WAVELENGTH DISPERSION COMPENSATION METHOD IN OPTICAL TRANSMISSION DEVICE

(75) Inventor: Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/869,810

(22) Filed: Aug. 27, 2010

(65) Prior Publication Data

US 2011/0052198 A1 Mar. 3, 2011

(30) Foreign Application Priority Data

Aug. 31, 2009 (JP) ................................ 2009-200080

(51) Int. Cl.
*H04B 10/08* (2011.01)
(52) U.S. Cl.
USPC ............................ 398/159; 398/147; 398/209
(58) Field of Classification Search
USPC ......................................... 398/159, 147, 209
See application file for complete search history.

(56) References Cited

U.S. PATENT DOCUMENTS

| | | | |
|---|---|---|---|
| 6,871,024 B2* | 3/2005 | Nishimoto et al. | 398/159 |
| 7,450,856 B2 | 11/2008 | Yoshimoto et al. | |
| 2003/0002112 A1* | 1/2003 | Hirano et al. | 359/161 |
| 2004/0184813 A1 | 9/2004 | Mikami | |
| 2007/0297804 A1 | 12/2007 | Honda et al. | |

FOREIGN PATENT DOCUMENTS

| | | |
|---|---|---|
| JP | 2002-208892 A | 7/2002 |
| JP | 2004-236097 | 8/2004 |
| JP | 2005-286382 A | 10/2005 |
| JP | 2008-010971 | 1/2006 |

* cited by examiner

*Primary Examiner* — Danny Leung
(74) *Attorney, Agent, or Firm* — Fujitsu Patent Center

(57) ABSTRACT

An optical transmission device includes: a variable dispersion compensator to give chromatic dispersion and output an input light, a branching unit to branch the light output from the variable dispersion compensator to a first part and a second part, a reproduction unit to reproduce an electric signal from the first part of the input light, a monitor unit to perform reproducing processing on the electric signal from the second part of the input light, control the variable dispersion compensator based on a result of the reproducing processing, and has a sensitivity to a variation of the chromatic dispersion which is higher than the sensitivity to the variation of the chromatic dispersion of the reproduction unit.

7 Claims, 13 Drawing Sheets

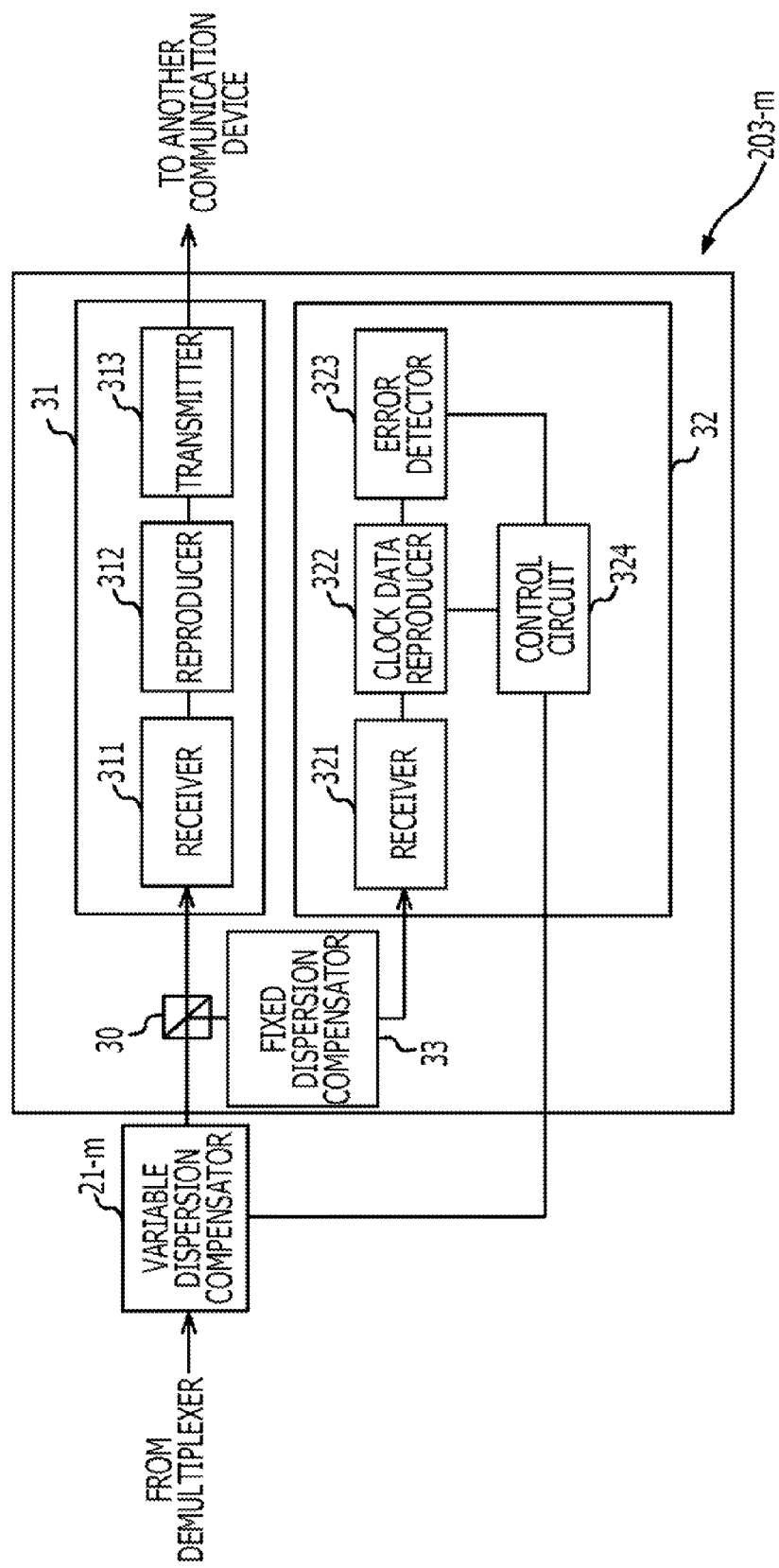

OPTICAL TRANSMISSION DEVICE, TRANSMISSION AND RECEPTION MODULE, OPTICAL TRANSMISSION SYSTEM, AND WAVELENGTH DISPERSION COMPENSATION METHOD IN OPTICAL TRANSMISSION DEVICE

CROSS-REFERENCE TO RELATED APPLICATIONS

This application is based upon and claims the benefit of priority from the prior Japanese Patent Application No. 2009-200080 filed on Aug. 31, 2009, the entire contents of which are incorporated herein by reference.

FIELD

The embodiments discussed herein are related to an optical transmission device, a transmission and reception module, an optical transmission system, and a chromatic dispersion (or wavelength dispersion) compensation method.

BACKGROUND

Conventionally, an optical transmission system using light as a signal medium has been used to perform high-speed and long-distance communication. In the above-described optical transmission system, a waveform of an optical signal is deteriorated by chromatic dispersion due to characteristics of the optical transmission path. When the wavelength of the optical signal is deteriorated, there is a high possibility that a transmission error occurs with respect to an original signal included in the optical signal. Therefore, for the optical transmission system, a technique has been developed to compensate for chromatic dispersion generated on the optical transmission path by a variable dispersion compensator located in a receiving unit of an optical transmission device that transmits and receives the optical signal.

For example, a dispersion compensation device that controls a dispersion compensation amount of the variable dispersion compensator has been developed based on code error information of a signal that is output through an optical reception path from the variable dispersion compensator. Moreover, a dispersion compensation method for controlling the dispersion compensation amount of the variable dispersion compensator according to the code error information in accordance to a code type in a data signal obtained by receiving a dispersion-compensated optical signal has been developed.

The conventional techniques are disclosed in Japanese Laid-open Patent Publication No. 2002-208892 and Japanese Laid-open Patent Publication No. 2005-286382.

SUMMARY

According to an aspect of the invention, an optical transmission device includes: a variable dispersion compensator to give chromatic dispersion and output an input light, a branching unit to branch the light output from the variable dispersion compensator to a first part and a second part, a reproduction unit to reproduce an electric signal from the first part of the input light, a monitor unit to perform reproducing processing on the electric signal from the second part of the input light, control the variable dispersion compensator based on a result of the reproducing processing, and has a sensitivity to a variation of the chromatic dispersion which is higher than the sensitivity to the variation of the chromatic dispersion of the reproduction unit.

The object and advantages of the invention will be realized and attained by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 12 is an overview configuration diagram of an exemplary receiving unit of a reception device according to another embodiment.

DESCRIPTION OF EMBODIMENTS

Figure 1:
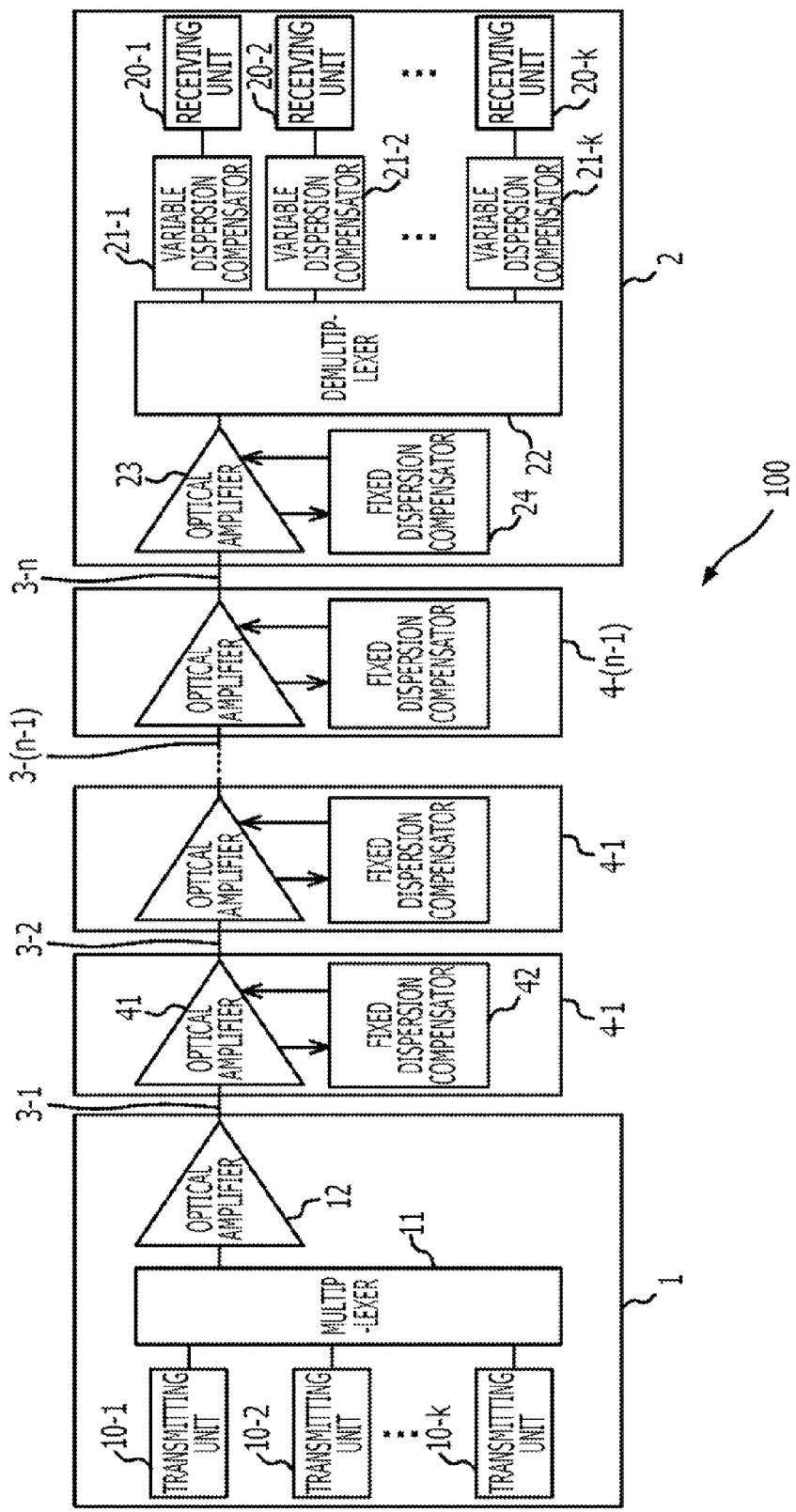
FIG. 1 is an overview configuration diagram of an exemplary optical transmission system according to an embodiment.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

In an optical transmission system, dispersion characteristics of an optical transmission path may vary due to environmental change such as temperature change around the optical transmission path. If the dispersion characteristics of the optical transmission path vary during a communication, there is a possibility that a code error rate of an original signal, which is reproduced from an optical signal received by the optical transmission device, increases. The optical transmission device may correct the dispersion compensation amount of a variable dispersion compensator during the communication as desired. However, if the optical transmission device adjusts the dispersion compensation amount of the variable dispersion compensator after the code error rate of the original signal increases, the code error rate may further increase if the adjusted dispersion compensation amount is improper. For example, if the optical transmission device varies the dispersion compensation amount of the variable dispersion compensator to the negative direction when the dispersion of the optical transmission path varies to the negative direction, the variable dispersion compensator may not properly compensate the chromatic dispersion (or wavelength dispersion) of the optical transmission path. In this case, the waveform of the optical signal compensated by the variable dispersion compensator is further deteriorated. In some case, the optical transmission device may not perform error correction on the original signal, so that a normal communication may not be performed. Therefore, it is preferable that the optical transmission device compensates a variation of the dispersion characteristics of the optical transmission path before the code error rate with respect to the original signal reproduced from the received optical signal increases.

With reference to the diagrams, description will be made below of an optical transmission system according to an embodiment. In the optical transmission system, a reception device, which receives an optical signal transmitted through the optical transmission path from the transmission device, includes a reproduction unit and a monitor unit receiving the optical signal through the variable dispersion compensator. The reproduction unit reproduces an original signal from an optical signal that passes through the variable dispersion compensator. On the other hand, the monitor unit has a configuration in which the sensitivity to a variation of the chromatic dispersion is higher than the sensitivity to the variation of the chromatic dispersion in the reproduction unit. Moreover, the monitor unit detects the variation of the chromatic dispersion and controls the variable dispersion compensator.

FIG. 1 is an overview configuration diagram of an exemplary optical transmission system 100 according to an embodiment. The optical transmission system 100 is a Wavelength Division Multiplex (WDM) type transmission system, and each wavelength thereof has a communication speed of 10 Gigabits per second (Gbps). As illustrated in FIG. 1, the optical transmission system 100 includes a transmission device 1, a reception device 2, a plurality of optical transmission paths 3-1, 3-2, etc., and 3-n (n is a natural number), and a plurality of relay devices 4-1, 4-2, etc., and 4-(n−1). The transmission device 1 is connected to the optical transmission path 3-1. The reception device 2 is connected to the optical transmission path 3-n. Accordingly, the optical transmission system 100 may transmit the optical signal to the reception device 2 from the transmission device 1 through a plurality of optical transmission paths 3-1, 3-2, etc., and 3-n, and a plurality of relay devices 4-1, 4-2, etc., and 4-(n−1). The optical transmission paths 3-i and 3-(i+1) (1< or =i<n) are connected through the relay device 4-i. In the optical transmission system 100, the original signal according to a prescribed standard such as Synchronous Optical NETwork (SONET)/Synchronous Digital Hierarchy (SDH) and Ethernet is input to the transmission device 1 from another communication device (not illustrated) that is connected to the transmission device 1. The transmission device 1 maps the original signal on a frame according to the prescribed standard such as SONET/SDH and Ethernet, for example. The transmission device 1 transmits the frame as an optical signal to the reception device 2 through the optical transmission path 3-i and the relay device 4-i. The reception device 2 reproduces a frame from the received optical signal, extracts the original signal from the reproduced frame, and outputs the original signal to another communication device (not illustrated), which is connected to the reception device 2, according to the same communication standard as the communication standard by which the transmission device 1 receives the original signal.

The transmission device 1 includes a plurality of transmitting units 10-1, 10-2, etc., and 10-k (k is an integer of two or more), a multiplexer 11, and an optical amplifier 12. Each of the transmitting units 10-1, 10-2, etc., and 10-k generates an optical signal of a single wavelength obtained by mapping the original signal to be transmitted to the reception device 2 in a frame unit. The wavelengths of the optical signals generated by the transmitting units 10-1, 10-2, etc., and 10-k are preferably different from each other.

The multiplexer 11 wavelength-multiplexes the optical signals having different wavelengths generated by the transmitting unit 10-1, 10-2, etc., and 10-k. The optical amplifier 12 amplifies the optical signal that is multiplied by the multiplexer 11 and outputs the amplified optical signal to the optical transmission path 3-1. The multiplexer 11 may be any one of various multiplexers that are usable in a WDM type optical transmission device. Moreover, the optical amplifier 12 may be any one of various optical amplifiers that are usable in the optical transmission device. The optical amplifier 12 may be, for example, an optical fiber amplifier that is added with rare earth metals such as erbium and neodymium.

The optical transmission path 3-j (1< or =j<or =n) is, for example, one or more single mode fibers. The relay device 4-i (1< or =i<n) includes an optical amplifier 41 and a fixed dispersion compensator 42. The relay device 4-i amplifies the light, which is input from the optical transmission path 3-i, by using the optical amplifier 41. The relay device 4-i compensates the chromatic dispersion, which is generated in the optical transmission path 3-i with respect to the input light, by using the fixed dispersion compensator 42. The relay device 4-i outputs the light that is amplified and in which the chromatic dispersion is compensated to the optical transmission path 3-(i+1).

The optical amplifier 41 may be, for example, an optical fiber amplifier that is added with rare earth metals such as erbium and neodymium. The fixed dispersion compensator 42 may be, for example, a dispersion compensation fiber having dispersion characteristics obtained by inverting the dispersion characteristics of the optical transmission path 3-i. If a transmission distance between the transmission device 1 and the reception device 2 is short, the relay device 4-i may be omitted.

The reception device 2 includes a plurality of receiving units 20-1, 20-2, etc., and 20-k (k is an integer of two or more), variable dispersion compensators 21-1, 21-2, etc., and 21-k, a demultiplexer 22, an optical amplifier 23, and a fixed dispersion compensator 24. The reception device 2 amplifies the light, which is received from the optical transmission path 3-n, by using the optical amplifier 23. As for the input light, the reception device 2 compensates for the chromatic dispersion, which is generated in the optical transmission path 3-n, by using the fixed dispersion compensator 24. The optical amplifier 23 may be, for example, an optical fiber amplifier that is added with rare earth metals such as erbium and neodymium. The fixed dispersion compensator 24 may be, for example, a chromatic dispersion compensation fiber having dispersion characteristics obtained by inverting the dispersion characteristics of the optical transmission path 3-n.

As illustrated in FIG. 1, in the reception device 2, the light that is amplified by the optical amplifier 23 and in which the chromatic dispersion is compensated by the fixed dispersion compensator 24 is input to the multiplexer 22. The demultiplexer 22 demultiplexes the input light into a plurality of lights of a single wavelength. The demultiplexer 22 outputs the light of each wavelength to the variable dispersion compensators 21-1, 21-2, etc., and 21-k, separately. The demultiplexer 22 may be any one of various multiplexers that are usable in a WDM type optical transmission device.

The chromatic dispersion characteristics of the fixed dispersion compensator 41 of the relay device 4-i and of the fixed dispersion compensator 24 of the reception device 2 do not completely correspond to the inverted chromatic dispersion characteristic of the optical transmission path 3-i. Therefore, the fixed dispersion compensator 42 of the relay device 4-i and the fixed dispersion compensator 24 of the reception device 2 may not completely compensate the chromatic dispersion with respect to optical signals of all the wavelengths. Accordingly, in the system illustrated in FIG. 1, the variable dispersion compensators 21-1, 21-2, etc., and 21-k are allocated corresponding to the light of the wavelengths, respectively. The variable dispersion compensators 21-1, 21-2, etc., and 21-k properly compensate residual chromatic dispersion of each wavelength that was not compensated by the fixed dispersion compensator 42 of the relay device 4-i or the fixed dispersion compensator 24 of the reception device 2.

Moreover, the variable dispersion compensators 21-1, 21-2, etc., and 21-k compensate for a variation of residual dispersion generated by an environment change such as temperature change while the communication is performed.

Therefore, the variable dispersion compensators 21-1, 21-2, etc., and 21-k may vary the dispersion compensation amount according to a control signal from the corresponding receiving units 20-1, 20-2, etc., and 20-k. Here, each of the variable dispersion compensators 21-1, 21-2, etc., and 21-k may be, for example, a Fiber Bragg Grating (FBG). Alternatively, each of the variable dispersion compensators 21-1, 21-2, etc., and 21-k may be a Virtually Imaged Phased Array (VIPA) type variable dispersion compensator. Alternatively, each of the variable dispersion compensators 21-1, 21-2, etc., and 21-k may be a micro optics type variable dispersion compensator or a Planar Lightwave Circuit (PLC) type variable dispersion compensator.

By passing through the variable dispersion compensators 21-1, 21-2, etc., and 21-k, the light of each wavelength in which the chromatic dispersion is compensated is input to the receiving units 20-1, 20-2, etc., and 20-k, respectively.

The receiving units 20-1, 20-2, etc., and 20-k reproduce an original signal from the received optical signal.

Figure 2:
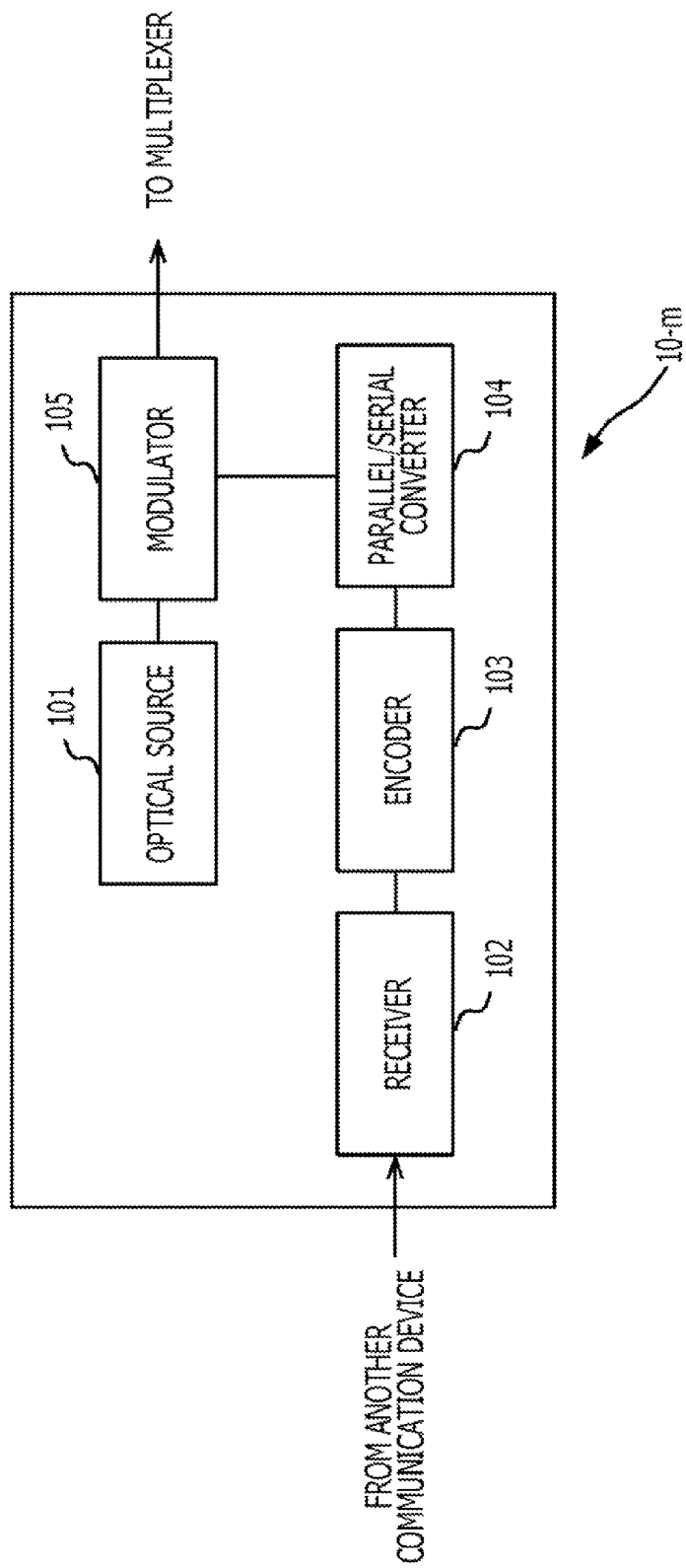
FIG. 2 is an overview configuration diagram of an exemplary transmitting unit of a transmission device.

FIG. 2 is an overview configuration diagram of an exemplary transmitting unit 10-m (1< or =m< or =k). As illustrated in FIG. 2, the transmitting unit 10-m includes an optical source 101, a receiver 102, an encoder 103, a parallel/serial converter 104, and a modulator 105. The configuration and function of the transmitting unit 10-m may be the same as the transmitting unit 10-i (1< or =i<or =k, i not equal to m) excluding the wavelength of the light emitted from the optical source 101. Therefore, the description below will be of only one transmitting unit 10-m.

The optical source 101 outputs a light of a prescribed optical power level while the transmitting unit 10-m generates an optical signal. The optical source 101 includes, for example, a laser diode that outputs a light whose wavelength is substantially the same as a zero dispersion wavelength of each of the optical transmission paths 3-1, 3-2, etc., and 3-n.

The receiver 102 of the transmitting unit 10-m receives an original signal such as SONET/SDH or Ethernet from another communication device (not illustrated) according to a prescribed communication standard. Then the receiver 102 transmits the received original signal to the encoder 103. Therefore, the receiver 102 includes, for example, a photoelectric conversion element such as an Avalanche Photodiode (APD) or a PIN photodiode if the original signal is an optical signal. Moreover, the receiver 102 may include an amplifier circuit that amplifies an electric signal output from the photoelectric conversion element and may include an analog-digital converter that converts the electric signal amplified by the amplifier circuit into a digital signal. If the transmitting unit 10-i receives the original signal as an electric signal from another communication device, the receiver 102 may include a communication interface circuit according to the communication standard of the original signal.

The encoder 103 maps the original signal received from the receiver 102 on a frame in accordance to the prescribed communication standard such as SONET/SDH or Ethernet, for example. Moreover, the encoder 103 may generate a coded signal in a frame unit by adding an error correction code such as Forward Error Correction (FEC) and header information to the frame. For example, an integrated circuit that realizes the above-described function may be used as the encoder 103. The encoder 103 transmits the generated coded signal to the parallel/serial converter 104.

The parallel/serial converter 104 may be an integrated circuit that converts the coded signal received from the encoder 103 into a serial signal. The parallel/serial converter 104 may be a SERializer/DESerializer (SerDes), for example. The parallel/serial converter 104 superimposes a clock signal on the coded signal. Then the parallel/serial converter 104 transmits the signal converted into the serial signal to the modulator 105.

The modulator 105 generates an optical signal to be transmitted by modulating the light output from the optical source 101 according to the signal received from the parallel/serial converter 104. The modulator 105 outputs the generated optical signal to the multiplexer 11. The modulator 105 includes, for example, a Mach-Zehnder type modulator and a driver circuit that drives the Mach-Zehnder type modulator. The transmitting unit 10-m may be a device of a direct modulation system for directly modulating an intensity of the light output from the optical source 101 based on the original signal received from another communication device.

Figure 3:
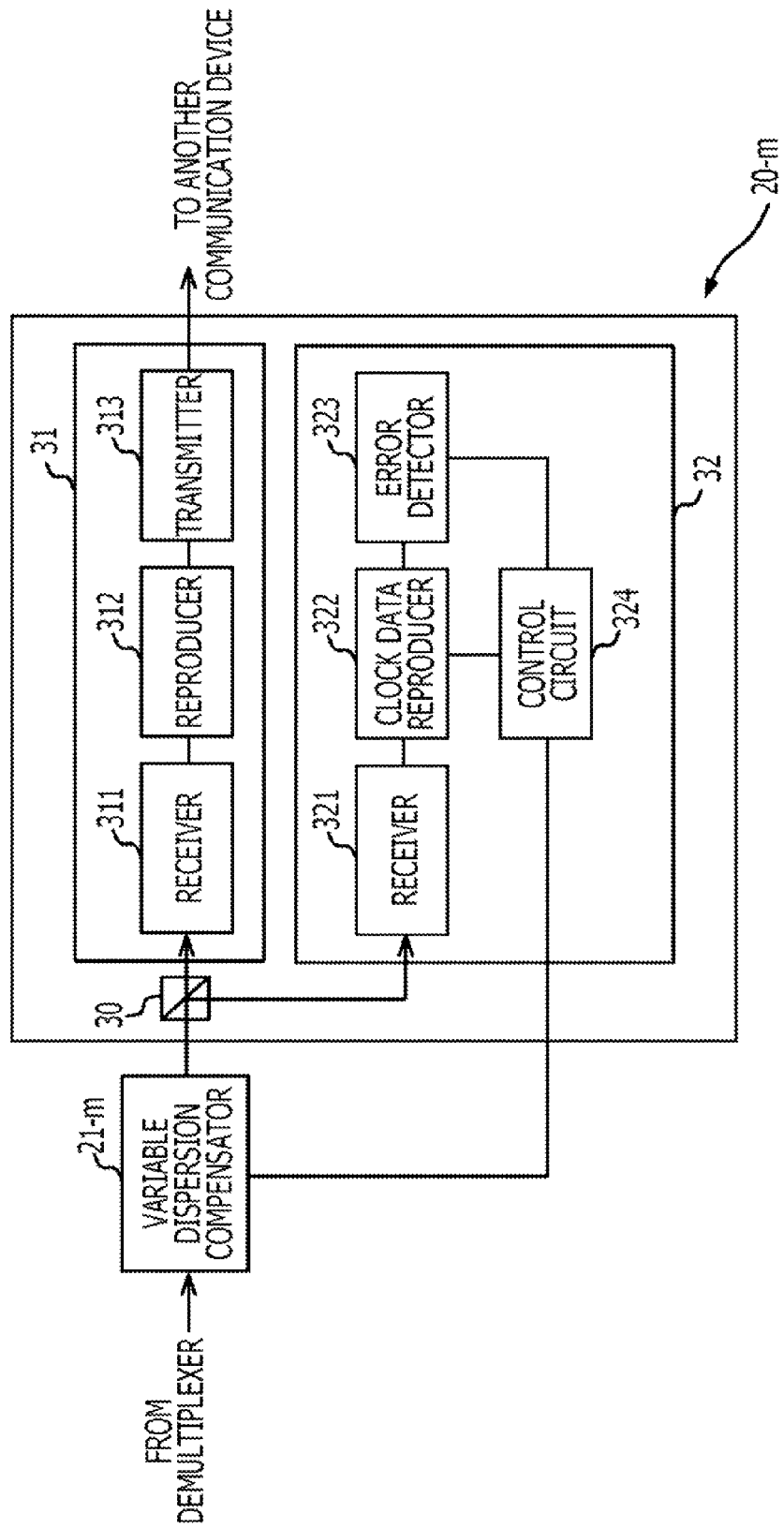
FIG. 3 is an overview configuration diagram of an exemplary receiving unit of a reception device.

FIG. 3 is an overview configuration diagram of an exemplary receiving unit 20-m (1< or =m< or =k). As illustrated in FIG. 3, the receiving unit 20-m includes a beam splitter 30, a reproduction unit 31, and a monitor unit 32. The configuration and the function of the receiving unit 20-m may be substantially the same as the configuration and the function of the receiving unit 20-i (1< or =i< or =k, i not equal to m). Accordingly, the description below will be of only one receiving unit 20-m. The beam splitter 30 branches, to the monitor unit 32 of the reproduction unit 31, the light passing through the variable dispersion compensator 21-m to be compensated. For example, a beam splitter in which the ratio of the intensity of the light toward the reproduction unit 31 and the intensity of the light toward the monitor unit 32 is 1:1 may be used as the beam splitter 30.

The reproduction unit 31 reproduces an original signal from the optical signal received through the beam splitter 30. The reproduction unit 31 transmits the reproduced original signal to another communication device (not illustrated). Therefore, the reproduction unit 31 includes a receiver 311, a reproducer 312, and a transmitter 313. The receiver 311 receives and converts the optical signal into an electric signal. Accordingly, the receiver 311 includes, for example, a 10 Gigabit Small Form Factor Pluggable (XFP) type transceiver as a photoelectric converter that converts the optical signal into the electric signal. The receiver 311 separates the clock signal and the data signal from the electric signal, extracts the data signal, and outputs the extracted data signal to the reproducer 312. The receiver 311 includes, for example, a SerDes as a circuit that separates the clock signal and the data signal from the electric signal.

The reproducer 312 detects a frame from the data signal received from the receiver 311 according to the communication standard used to form a frame in the transmission device 1. The reproducer 312 performs code error correction processing on the original signal that is de-mapped from the detected frame based on the FEC or the like. At this time, the reproducer 312 may measure the code error rate. To perform the above-described processing, the reproducer 312 may include, for example, an integrated circuit for reproduction complying with a Framer or an Optical Transport Network (OTN). The reproducer 312 outputs the reproduced original signal to the transmitter 313.

The transmitter 313 of the receiving unit 20-m transmits the original signal received from the reproducer 312 to another communication device according to the same communication standard as the communication standard by which the transmission device 1 receives the original signal from the other communication device. Accordingly, the transmitter 313 includes, for example, an interface circuit that operates according to the communication standard.

Based on the optical signal input from the beam splitter 30, the monitor unit 32 monitors whether or not the clock signal and the data signal may be reproduced from the optical signal or monitors a variation of the code error rate with respect to the reproduced data signal. According to the variation of the residual chromatic dispersion, the clock signal or the data signal may not be reproduced or the code error rate may increase. The monitor unit 32 performs feedback control on the variable dispersion compensator 21-m in such a way that the residual chromatic dispersion becomes a predetermined value, e.g., a substantially optimum or desired value, if the clock signal or the data signal may not be reproduced or if the code error rate increases. Moreover, at the starting time of the reception device 2, the monitor unit 32 may obtain the predetermined value of the dispersion compensation amount by monitoring whether or not the clock signal and the data signal may be reproduced or by monitoring the variation of the code error rate with respect to the data signal based on the optical signal received through the beam splitter 30. As illustrated in FIG. 3, the monitor unit 32 includes a receiver 321, a clock data reproducer 322, an error detector 323, and a control circuit 324.

Figure 4:
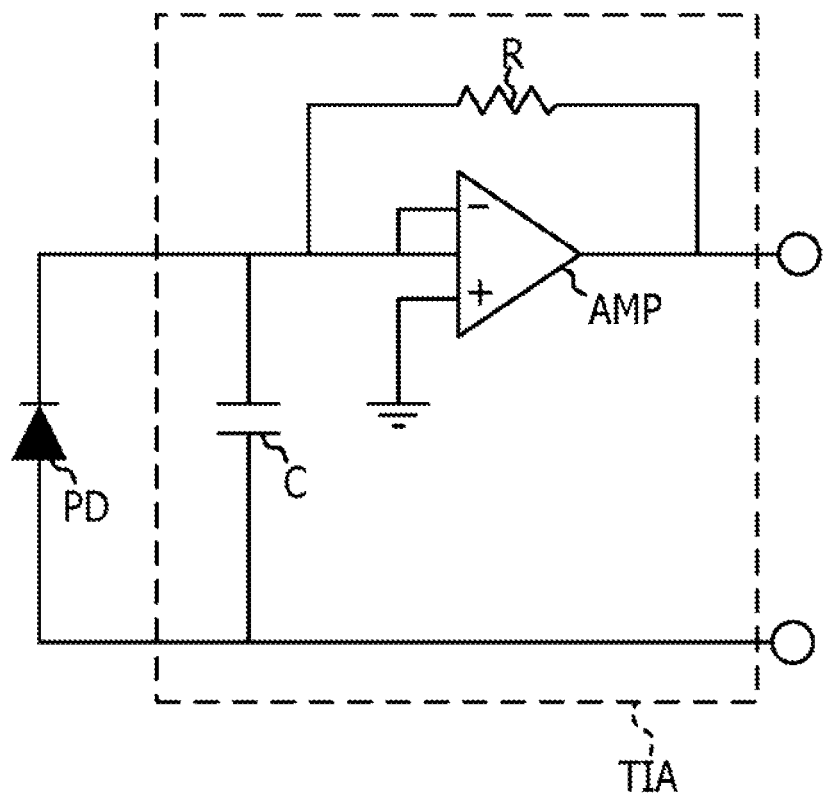
FIG. 4 is an equivalent circuit diagram of an exemplary receiver of an exemplary monitor unit of the receiving unit.

The receiver 321 converts the optical signal input from the beam splitter 30 into an electric signal. FIG. 4 is an equivalent circuit diagram of the receiver 321. As illustrated in FIG. 4, the receiver 321 includes, for example, a photoelectric converter PD and a trans-impedance type amplifier circuit TIA. The photoelectric converter PD may be, for example, an APD or a PIN photodiode. The receiver 321 may be an XFP type transceiver. According to the variation of the residual chromatic dispersion, the receiver 321 is designed in such a way that the clock signal or the data signal may not be reproduced or the code error rate increases in the monitor unit 32 rather than the reproduction unit 31. That is, the receiver 321 of the monitor unit 32 is designed in such a way that the sensitivity to the variation of the residual chromatic dispersion is higher than the sensitivity to the variation of the residual chromatic dispersion of the receiver 311 of the reproduction unit 31. For example, the receiver 321 is designed in such a way that the frequency band, in which the waveform of the electric signal converted from the optical signal is not deteriorated, is narrower than the frequency band in the receiver 311 of the reproduction unit 31.

$$BW = \frac{g}{2\pi RC} \quad (1)$$

For example, as for the receiver 321 illustrated in FIG. 4, the passband BW is expressed in formula (1). In this case, "g" indicates an open loop gain. "R" indicates a resistant value of the resistance unit included in the amplifier TIA. "C" indicates the amount of the condenser included in the amplifier TIA. By increasing the RC time constant of the amplifier TIA, the receiver 321 may have a narrower passband than the passband of the receiver 311 of the reproduction unit 31. In this manner, the sensitivity to the variation of the residual chromatic dispersion of the monitor unit 32 may be set higher than the sensitivity to the variation of the residual chromatic dispersion of the reproduction unit 31.

Alternatively, by setting the resistance value of an earth terminal of the receiver 321 higher than the resistance value of the receiver 311 of the reproduction unit 31, the receiver 321 may have a narrower passband than the passband of the receiver 311 of the reproduction unit 31. Moreover, an operational amplifier AMP of the amplifier TIA has a Heterojunction Bipolar Transistor (HBT), and a circuit constant of the receiver 321 may be set so that peaking is produced in a prescribed frequency. Alternatively, by adjusting a production condition of the HBT, the amplifier TIA may produce the peaking in the prescribed frequency. Accordingly, the receiver 321 may have a narrower passband than the passband of the receiver 311 of the reproduction unit 31. The receiver 321 outputs the obtained electric signal to the clock data reproducer 322.

The clock data reproducer 322 separates the clock signal and the data signal from the electric signal received from the receiver 321. Accordingly, the clock data reproducer 322 includes, for example, a phase synchronization circuit. The phase synchronization circuit reproduces a clock signal by detecting an edge included in the received electric signal and adjusting a reference clock in the clock data reproducer 322 so that the edge corresponds to the timing. The clock data reproducer 322 may be, for example, a Clock Data Recovery (CDR) circuit or a SerDes.

Here, the range of frequency of the electric signal, in which the clock data reproducer 322 may reproduce the clock signal, may be narrower than the range of frequency of the electric signal, in which the circuit separating the clock signal and the data signal of the receiver 311 of the reproduction unit 31, may reproduce the clock signal. Therefore, the monitor unit 32 may increase the sensitivity to the variation of the residual chromatic dispersion to be higher than the sensitivity to the variation of the residual chromatic dispersion of the reproduction unit 31.

If the clock data reproducer 322 separates the clock signal and the data signal from the electric signal received from the receiver 321 and reproduces the clock signal, the clock data reproducer 322 transmits the data signal to the error detector 323. On the other hand, if the clock data reproducer 322 does not reproduce the clock signal from the electric signal received from the receiver 321, the clock data reproducer 322 transmits, to the control circuit 324, an out-of-synchronism signal indicating that the clock signal may not be reproduced.

The error detector 323 determines whether or not the frame may be detected from the data signal received from the clock data reproducer 322. If the frame may be detected, the error detector 323 measures the code error rate by performing the code error correction processing based on the FEC or the like with respect to the original signal that is de-mapped from the detected frame. The error detector 323 outputs the measured code error rate to the control circuit 324. If the frame may not be detected from the data signal received from the clock data reproducer 322, the error detector 323 outputs, to the control circuit 324, the frame out-of-synchronism signal indicating that the frame may not be detected. To perform the above-described processing, the error detector 323 may include, for example, an integrated circuit for reproduction complying with, for example, the Framer or the OTN.

The control circuit 324 may include a micro processor unit, a volatile semiconductor memory, a nonvolatile semiconductor memory, and a peripheral circuit. The control circuit 324 controls the dispersion compensation amount of the variable dispersion compensator 21-m based on the code error rate or the frame out-of-synchronism signal input from the error detector 323 or on the out-of-synchronism signal input from the clock data reproducer 322.

For example, when controlling the dispersion compensation amount of the variable dispersion compensator 21-m based on the code error rate input from the error detector 323, the control circuit 324 varies the dispersion compensation amount if the code error rate increases higher than the value corresponding to a predetermined value of the residual chromatic dispersion. The control circuit 324 sets the dispersion compensation amount of the variable dispersion compensator 21-m to the dispersion compensation amount in a case where the code error rate decreases to the value corresponding to the predetermined value of the residual chromatic dispersion.

When receiving the frame out-of-synchronism signal from the error detector 323, the control circuit 324 varies the dispersion compensation amount of the variable dispersion compensator 21-m until the control circuit 324 does not receive the frame out-of-synchronism signal from the error detector 323. Then the control circuit 324 sets the dispersion compensation amount of the variable dispersion compensator 21-m to the dispersion compensation amount in a case where the control circuit 324 does not receive the frame out-of-synchronism signal from the error detector 323. At the same time, when receiving the out-of-synchronism signal (the signal indicating that the clock signal may not be reproduced) from the clock data reproducer 322, the control circuit 324 varies the dispersion compensation amount of the variable dispersion compensator 21-m until the control circuit 324 does not receive the out-of-synchronism signal from the clock data reproducer 322. The control circuit 324 sets the dispersion compensation amount of the variable dispersion compensator 21-m to the dispersion compensation amount in a case where the control circuit 324 does not receive the out-of-synchronism signal from the clock data reproducer 322.

Figure 5:
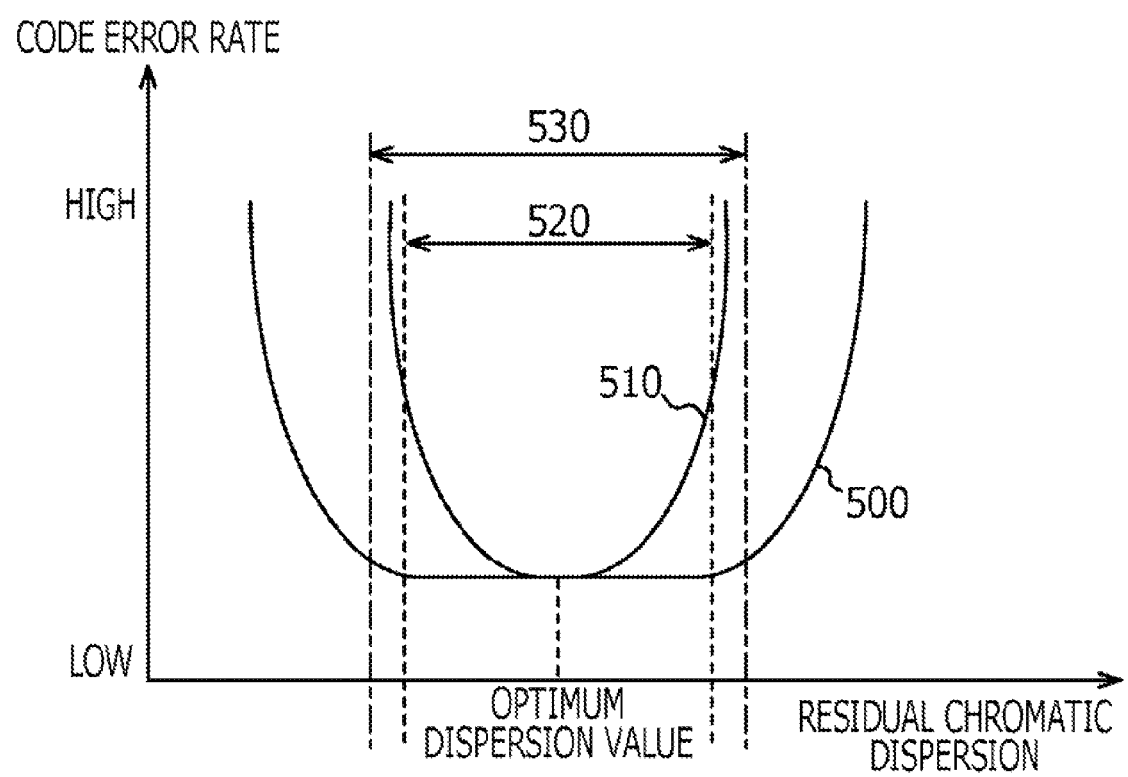
FIG. 5 is a graph illustrating an exemplary relation of a code error rate used by a reproduction unit and a monitor unit with respect to residual chromatic dispersion.

FIG. 5 is a graph illustrating a relation of a code error rate obtained by the reproduction unit 31 and the monitor unit 32 with respect to the residual chromatic dispersion. In the graph illustrated in FIG. 5, the horizontal axis indicates residual chromatic dispersion, and the vertical axis indicates a code error rate. The curved line 500 indicates the code error rate obtained by the reproducer 312 of the reproduction unit 31. The curved line 510 indicates the code error rate obtained by the error detector 323 of the monitor unit 32. Furthermore, a range 520 between the dotted lines indicates a range in which the error detector 323 of the monitor unit 32 may detect a frame. That is, if the residual chromatic dispersion is deviated from the range 520, the error detector 323 outputs the frame out-of-synchronism signal. A range 530 between the dashed lines indicates a range in which the clock data reproducer 322 of the monitor unit 32 may reproduce a clock signal. That is, if the residual chromatic dispersion is deviated from the range 530, the clock data reproducer 322 outputs an out-of-synchronism signal.

As illustrated in FIG. 5, even when the residual chromatic dispersion varies either to a negative direction or a positive direction from a predetermined dispersion value, a code error rate 510 obtained by the error detector 323 of the monitor unit 32 rapidly increases higher than a code error rate 500 obtained by the reproducer 312 of the reproduction unit 31. Therefore, by adjusting the dispersion compensation amount of the variable dispersion compensator 21-m when the code error rate obtained by the error detector 323 increases, the receiving unit 20-m may substantially inhibit the code error rate of the reproduction unit 31 from increasing. Therefore, if the amount of the chromatic dispersion generated on any of the optical transmission paths 3-j varies during the communication, the receiving unit 20-m may inhibit the reproduction unit 31 from being unable to reproduce the original signal from the optical signal received by the reproduction unit 31 through the optical transmission path.

The range 520 in which the error detector 323 may detect the frame and the range 530 in which the clock data reproducer 322 may reproduce the clock signal are narrower than the range in which the code error rate obtained by the reproducer 312 of the reproduction unit 31 is almost the predetermined value. Consequently, by adjusting the dispersion compensation amount of the variable dispersion compensator 21-m when receiving the frame out-of-synchronism signal or the out-of-synchronism signal, the receiving unit 20-m may inhibit an increase of the code error rate of a case where the reproduction unit 31 reproduces the original signal.

At the starting time of the reception device 2, the control circuit 324 may determine the predetermined dispersion compensation amount of the variable dispersion compensator 21-m by varying the dispersion compensation amount when the residual chromatic dispersion is included in the range 520 in which the error detector 323 may detect the frame. If the residual chromatic dispersion is deviated from the range 520, the control circuit 324 may greatly vary the dispersion compensation amount. On the other hand, when the control circuit 324 obtains the predetermined dispersion compensation amount based on the code error rate 500 obtained by the reproducer 312 of the reproduction unit 31, the reproduction 312 is varies the dispersion compensation amount over the whole range of the residual chromatic dispersion in which the reproducer 312 may reproduce the original signal. Therefore, the control circuit 324 may obtain the predetermined dispersion compensation amount in a shorter period of time than the period of time in which the predetermined dispersion compensation amount is obtained based on the code error rate obtained by the reproducer 312 of the reproduction unit 31.

The range 520 in which the error detector 323 of the monitor unit 32 may detect the frame, that is, the range in which the error detector 323 may reproduce the original signal is preferably set to be equal to or narrower than the range in which the code error rate of a case where the reproduction unit 31 reproduces the original signal is low. By setting the range 520 as described above, the monitor unit 32 may adjust the dispersion compensation amount of the variable dispersion compensator 21-m before the code error rate of the reproduction unit 31 increases. For example, if the range of the residual chromatic dispersion in which the reproduction unit 31 may reproduce the original signal is ±800 picoseconds/nanometer (psec/nm) centering a predetermined residual chromatic dispersion, the range 520 in which the error detector 323 may detect the frame may be ±350 psec/nm centering the predetermined residual chromatic dispersion.

Figure 6:
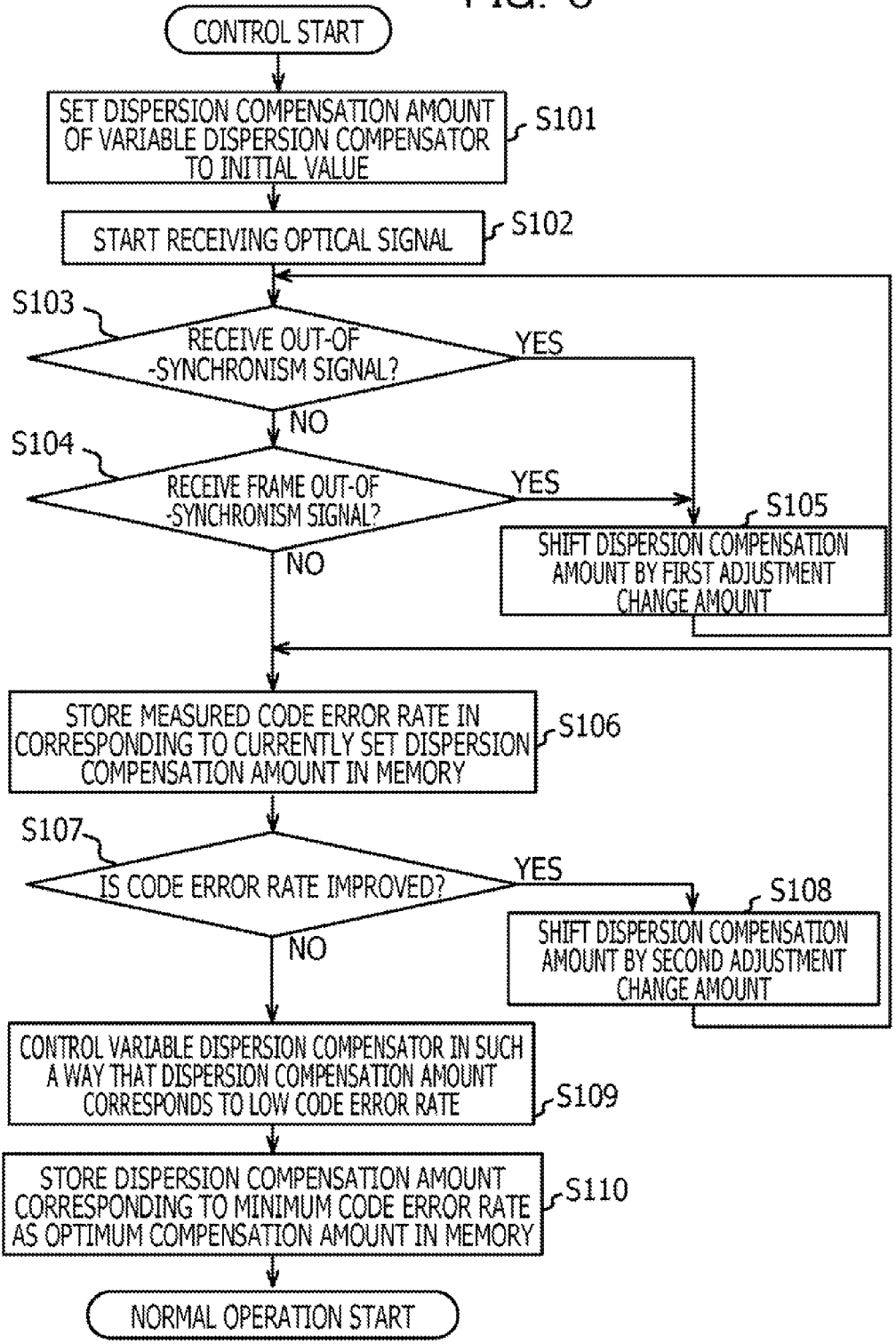
FIG. 6 is an exemplary operation flowchart of processing for deciding an predetermined value of a dispersion compensation amount at a starting time of the reception device.

FIG. 6 is an exemplary operation flowchart of processing for determining the predetermined value of the dispersion compensation amount, which is controlled by the control circuit 324 of the monitor unit 32 of the receiving unit 20-m, at the starting time of the reception device 2. When the reception device 2 is started, the control circuit 324 of the monitor unit 32 of the receiving unit 20-m sets the dispersion compensation amount of the variable dispersion compensator 21-m corresponding to the receiving unit 20-m to an initial value (Operation S101). The initial value is, for example, the upper limit value or the lower limit value of an adjustable dispersion compensation amount. Next, the control circuit 324 starts receiving the optical signal transmitted from the transmission device 1 of the monitor unit 32 through the optical transmission paths 3-1, 3-2, etc., and 3-n and the relay devices 4-1, 4-2, etc., and 4-(n-1) (Operation S102).

The control circuit 324 determines whether or not the control circuit 324 receives the out-of-synchronism signal from the clock data reproducer 322 (Operation S103). If the control circuit 324 receives the out-of-synchronism signal (Yes in Operation S103), the control circuit 24 shifts the dispersion compensation amount of the variable dispersion compensator 21-m by a first adjustment change amount (Operation S105). The first adjustment change amount is, for example, 50 psec/nm. If the initial value of the dispersion compensation amount is an upper limit value of the adjustable dispersion compensation amount, the control circuit 324 shifts the dispersion compensation amount to be decreased by the first adjustment change amount. On the other hand, if the initial value of the dispersion compensation amount is a lower limit value of the adjustable dispersion compensation amount, the control circuit 324 shifts the dispersion compensation amount to be increased by the first adjustment change amount.

On the other hand, if the control circuit does not receive the out-of-synchronism signal (No in Operation S103), the control circuit 324 determines whether or not the control circuit 324 receives a frame out-of-synchronism signal from the error detector 323 (Operation S104). If the control circuit 324 receives the frame out-of-synchronism signal (Yes in Operation S104), the control circuit 324 shifts the dispersion compensation amount of the variable dispersion compensator 21-m by the first adjustment change amount (Operation S105). After Operation S105 illustrated in FIG. 6, the control circuit 324 returns the control to Operation S103 illustrated in FIG. 6.

On the other hand, if the control circuit 324 does not receive the frame out-of-synchronism signal in Operation S104 illustrated in FIG. 6 (No in Operation S104), the control circuit 324 receives a code error rate measured by the error detector 323. The control circuit 324 stores, in a memory of the control circuit 324, the error rate corresponding to the dispersion compensation amount that is currently set (Operation S106).

Next, the control circuit 324 determines whether or not the code error rate is improved (Operation S107). If the code error rate is improved (Yes in Operation S107), the control circuit 324 shifts the dispersion compensation amount of the variable dispersion compensator 21-m by a second adjustment change amount (Operation S108). If the code error rate measured with respect to the current dispersion compensation amount decreases lower than the code error rate measured with respect to the previous dispersion compensation amount, the control circuit 324 determines that the code error rate is improved. The second adjustment change amount is preferably smaller than the first adjustment change amount. The second adjustment change amount is, for example, 20 psec/nm. If the initial value of the dispersion compensation amount is the upper limit value of the adjustable dispersion compensation amount, the control circuit 324 shifts the dispersion compensation amount by the second adjustment change amount. On the other hand, if the initial value of the dispersion compensation amount is the lower limit value of the adjustable dispersion compensation amount, the control circuit 24 shifts the dispersion compensation amount to be increased by the second adjustment change amount. In Operation S107 illustrated in FIG. 6, even if the current dispersion compensation amount is the first dispersion compensation amount in which the code error rate is measured, the control circuit 324 returns the control to Operation S108 illustrated in FIG. 6. After Operation S108 in FIG. 6, the control circuit 324 returns the control to Operation S106 in FIG. 6.

On the other hand, if the code error rate is not improved (No in Operation S107), the control circuit 324 controls the variable dispersion compensator 21-m so that the dispersion compensation amount corresponds to the low code error rate from among the code error rates stored in the memory (Operation S109). If the code error rate measured with respect to the current dispersion compensation amount is equal to or higher than the code error rate measured with respect to the previous dispersion compensation amount, the control circuit 324 determines that the code error rate is not improved. Finally, the control circuit 324 stores, in the memory, the dispersion compensation amount corresponding to the low code error rate as a predetermined compensation amount (Operation S110). If the variable dispersion compensator 21-m compensates the chromatic dispersion by using the predetermined compensation amount, the residual chromatic dispersion becomes the predetermined value. The control circuit 324 starts normal operation for performing communication between the receiving unit 20-m and the transmission device 1.

Figure 7:
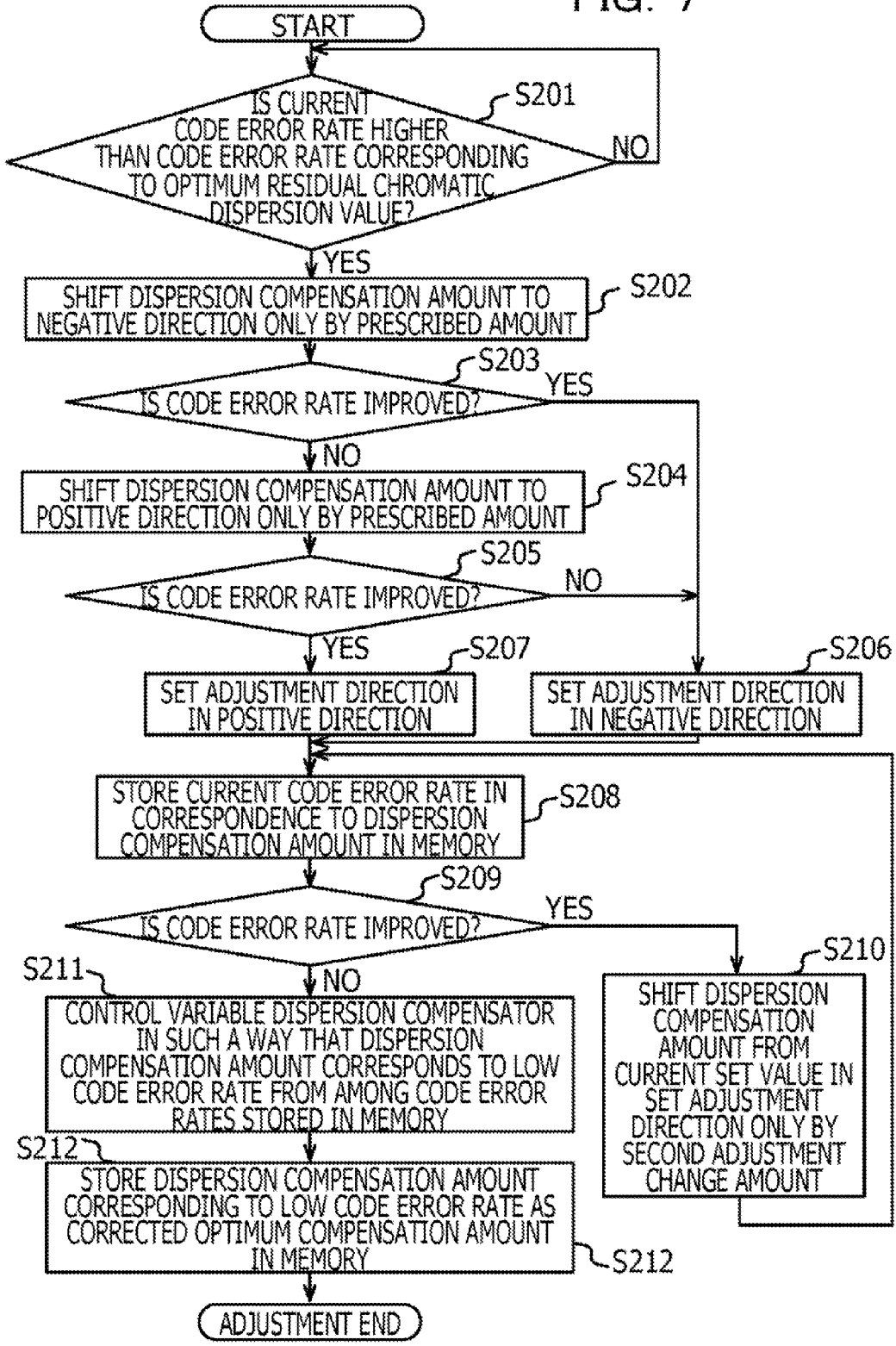
FIG. 7 is an exemplary operation flowchart of processing for adjusting the dispersion compensation amount when a chromatic dispersion amount generated on any of optical transmission paths varies during a communication.

FIG. 7 is an exemplary operation flowchart of processing for adjusting the dispersion compensation amount of the variable dispersion compensator 21-m when the chromatic dispersion amount generated on any of the optical transmission paths 3-j (1< or =j< or =n) varies during the communication. Firstly, the control circuit 324 of the monitor unit 32 of the receiving unit 20-m receives the current code error rate measured by the error detector 323. Then the control circuit 324 determines whether or not the current code error rate increases higher than the code error rate corresponding to the predetermined residual chromatic dispersion value (Operation S201). If the current code error rate corresponds to the code error rate corresponding to the predetermined residual chromatic dispersion value (NO in Operation S201), the control circuit 324 repeats the processing of Operation S201 illustrated in FIG. 7.

On the other hand, if the current code error rate increases higher than the code error rate corresponding to the predetermined residual chromatic dispersion value (Yes in Operation S201), the control circuit 324 determines whether the dispersion compensation amount is varied in a positive direction or a negative direction to correct the predetermined compensation amount. Firstly, the control circuit 324 shifts the dispersion compensation amount of the variable dispersion compensator 21-m from the predetermined compensation amount in the negative direction only by a prescribed amount (Operation S202). The prescribed amount is, for example, 20 psec/nm. The control circuit 324 stores, in the memory of the control circuit 324, the current code error rate in correspondence to the predetermined compensation value.

Next, the control circuit 324 determines whether or not the code error rate is improved (whether or not the code error rate decreases) (Operation S203). If the code error rate is improved (Yes in Operation S203), the control circuit 324 sets the adjustment direction of dispersion compensation amount in the negative direction (Operation S206). If the code error rate measured with respect to the current dispersion compensation amount decreases lower than the code error rate measured with respect to the predetermined compensation amount obtained before, the control circuit 324 determines that the code error rate is improved.

On the other hand, if the code error rate is not improved (No in Operation S203), the control circuit 324 shifts the dispersion compensation amount of the variable dispersion compensator 21-m from the predetermined compensation amount in the positive direction only by the prescribed amount (Operation S204). If the code error rate measured with respect to the current dispersion compensation amount is equal to or higher than the code error rate measured with respect to the predetermined compensation amount obtained before, the control circuit 324 determines that the code error rate is not improved. The control circuit 324 again determines whether or not the code error rate is improved (Operation S205). If the code error rate is improved (Yes in Operation S205), the control circuit 324 sets the adjustment direction of the dispersion compensation amount in the positive direction (Operation S207). On the other hand, if the code error rate is not improved (No in Operation S205), the control circuit 324 sets the adjustment direction of the dispersion compensation amount in the negative direction (Operation S206).

In Operation S206 or Operation S207 illustrated in FIG. 7, when the adjustment direction of the dispersion compensation amount is set, the control circuit 324 varies the dispersion compensation amount according to the adjustment direction and determines the predetermined dispersion compensation amount. After Operation S206 or Operation S207 illustrated in FIG. 7, the control circuit 324 stores, in the memory, the current code error rate corresponding to the dispersion compensation amount that is currently set (Operation S208). Next, the control circuit 324 determines whether or not the code error rate is improved (Operation S209). If the code error rate is improved (Yes in Operation S209), the control circuit 324 shifts the dispersion compensation amount in the set adjustment direction only by the second adjustment change amount (Operation S210). The second adjustment change amount is, for example, 20 psec/nm. After Operation S210 illustrated in FIG. 7, the control circuit 324 returns the control to Operation S208 illustrated in FIG. 7.

On the other hand, if the code error rate is not improved (No in Operation S209), the control circuit 324 controls the variable dispersion compensator 21-m so that the dispersion compensation amount corresponds to the low code error rate from among the code error rates stored in the memory (Operation S211). Finally, the control circuit 324 stores, in the memory, the dispersion compensation amount corresponding to the low code error rate as the corrected predetermined compensation amount (Operation S212). Then the control circuit 324 ends adjusting processing of the dispersion compensation amount.

As described above, as for the optical transmission system according to an embodiment, in the reception device of the optical transmission system, the monitor unit, which has a higher sensitivity to the variation of the residual chromatic dispersion than the sensitivity thereof of the reproduction unit reproducing the original signal, monitors the residual chromatic dispersion. The monitor unit controls the dispersion compensation amount of the variable dispersion compensator according to the residual chromatic dispersion. As described above, even if the residual chromatic dispersion varies due to the variation of the dispersion characteristics of the optical transmission path during the communication, the monitor unit may control the dispersion compensation amount of the variable dispersion compensator before the increase of the code error rate of a case where the reproduction unit reproduces the original signal. Accordingly, the optical transmission system may reduce the increase of the code error rate with respect to the original signal reproduced from the optical signal received by the reception device. As described above, the optical transmission system may compensate the dispersion characteristics even if the variation of the dispersion characteristics of the optical transmission path during the communication is small.

When determining the predetermined value of the dispersion compensation amount of the variable dispersion compensator at the starting time, the optical transmission system may vary the dispersion compensation amount by a relatively large adjustment amount until the error detector of the monitor unit measures the code error rate. The optical transmission system may reduce the adjustment amount of the dispersion compensation amount after the difference between the residual chromatic dispersion and the predetermined value is decreased until the error detector of the monitor unit may measure the code error rate. Consequently, since the optical transmission system may reduce the number of times of trial required until the predetermined dispersion compensation amount is determined, the starting time until the communication is made possible may be shortened.

Without referring to the out-of-synchronism signal from the clock data reproducer 322, the control circuit 324 of the monitor unit 32 illustrated in FIG. 3 may control the variable dispersion compensator 21-m by using only the frame out-of-synchronism signal from the error detector 323 and the code error rate. In this case, in the processing illustrated in FIG. 6, the control circuit 324 omits the processing of Operation S103 in the processing for determining the predetermined value of the dispersion compensation amount at the starting time of the reception device 2.

Figure 8:
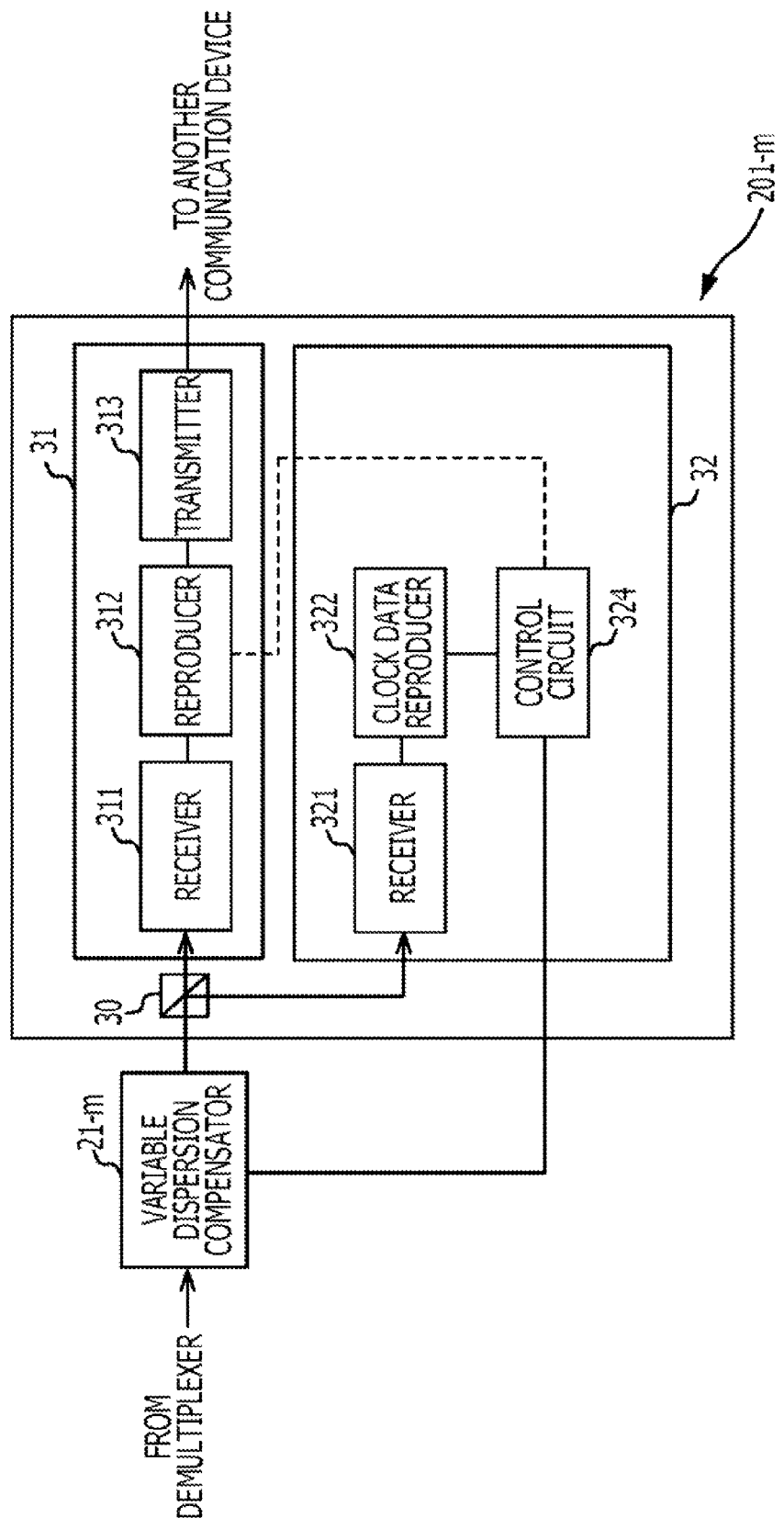
FIG. 8 is an exemplary overview configuration diagram of a receiving unit of a reception device according to another embodiment.

The reception device 2 illustrated in FIG. 1 may include a receiving unit having a configuration that is different from the configuration of the receiving unit 20-m illustrated in FIG. 3. FIG. 8 is an overview configuration diagram of the exemplary receiving unit 201-m (1< or =m< or =k) of the reception device 2 according to another embodiment. Each configuration element of the receiving unit 201-m illustrated in FIG. 8 is indicated with the same reference number as of the configuration element corresponding to the receiving unit 20-m illustrated in FIG. 3. As illustrated in FIG. 8, the receiving unit 201-m is different from the receiving unit 20-m illustrated in FIG. 3 in that the monitor unit 32 does not have an error detector.

In the receiving unit 201-m illustrated in FIG. 8, the control circuit 324 of the monitor unit 32 controls the variable dispersion compensator 21-m corresponding to the receiving unit 201-m depending whether or not the clock data reproducer 322 may reproduce a clock signal. As illustrated in FIG. 5, the range of the residual chromatic dispersion in which the clock data reproducer 322 of the monitor unit 32 may reproduce the clock signal is narrower than the range of the residual chromatic dispersion in which the reproducer 312 of the reproduction unit 31 may perform error correction on the original signal. Therefore, the control circuit 324 of the monitor unit 32 controls the variable dispersion compensator 21-m, so that the residual chromatic dispersion is included in the range in which the clock data reproducer 322 may produce the clock signal. Consequently, the control circuit 324 may inhibit the increase of the code error rate corresponding to the original signal that is reproduced from the optical signal received by the reception device 2.

At the starting time of the reception device 2, when the receiving unit 201-m determines the predetermined value of the dispersion compensation amount of the corresponding variable dispersion compensator 21-m, the processing of Operations S104, and S106 to S109 in the flowchart illustrated in FIG. 6 are omitted. If the control circuit 324 does not receive the out-of-synchronism signal from the clock data reproducer 322 in Operation S103, the control circuit 324 stores, in the memory of the control circuit 324, the dispersion compensation amount at that time as the predetermined compensation amount in Operation S110.

Alternatively, the control circuit 324 may determine the predetermined compensation amount of the variable dispersion compensator 21-m in such a way that the residual chromatic dispersion becomes an average value of the upper limit value and the lower limit value of the residual chromatic dispersion in which the clock data reproducer 322 may reproduce the clock signal. In this case, the control circuit 324 stores, in the memory of the control circuit 324, the dispersion compensation amount in a case where the out-of-synchronism signal is not received from the clock data reproducer 322 as a first dispersion compensation amount. After that, the control circuit 324 further shifts the dispersion compensation amount in the same direction as the direction in which the dispersion compensation amount is shifted in Operation S105 until the control circuit 324 again receives the out-of-synchronism signal from the clock data reproducer 322. The control circuit 324 stores the dispersion compensation amount occurring when the out-of-synchronism signal is received as a second dispersion compensation amount. The control circuit 324 controls the variable dispersion compensator 21-m in such a way that the average value of a first dispersion compensation amount and a second dispersion compensation amount is the predetermined compensation amount, and that the dispersion compensation amount of the variable dispersion compensator 21-m is the predetermined compensation amount thereof.

Figure 9:
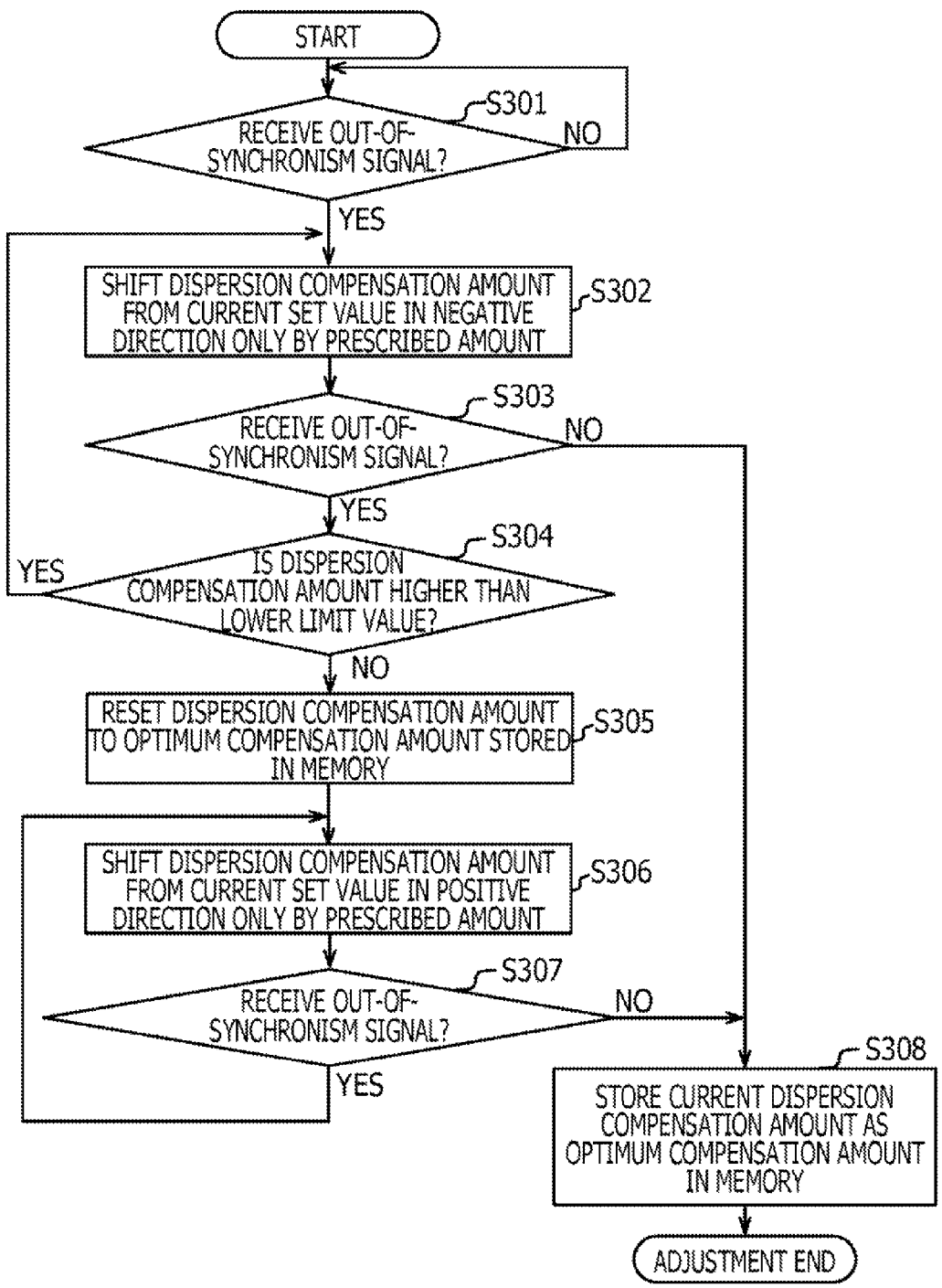
FIG. 9 is an exemplary operation flowchart of processing for adjusting a dispersion compensation amount when a chromatic dispersion amount, which is controlled by the monitor unit of the receiving unit according to another embodiment, generated on an optical transmission path varies during a communication.

FIG. 9 is an exemplary operation flowchart of processing for adjusting the dispersion compensation amount, which is controlled by the control circuit 324 of the monitor unit 32 of the receiving unit 201-m according to another embodiment, when the chromatic dispersion amount generated on any of the optical transmission paths during the communication.

Firstly, the control circuit 324 of the monitor unit 32 of the receiving unit 201-m determines whether or not the control circuit 324 receives the out-of-synchronism signal from the clock data reproducer 322 (Operation S301). If the control circuit 324 does not receive the out-of-synchronism signal (No in Operation S301), the control circuit 324 repeats the processing of Operation S301 illustrated in FIG. 9.

On the other hand, if the control circuit 324 receives the out-of-synchronism signal (Yes in Operation S301), the clock data reproducer 322 may not reproduce the clock signal. Therefore, the control circuit 324 shifts the dispersion compensation amount of the variable dispersion compensator 21-m in the negative direction from the current set value only by the prescribed amount (Operation S302). The prescribed amount is, for example, 50 psec/nm. The control circuit 324 determines whether or not the control circuit 324 receives the out-of-synchronism signal from the clock data reproducer 322 (Operation S303). If the control circuit 324 does not receive the out-of-synchronism signal (No in Operation S303), the control circuit 324 stores, in the memory of the control circuit 324, the current dispersion compensation amount as the corrected predetermined compensation amount (Operation S308). The control circuit 324 ends the adjusting processing of the dispersion compensation amount.

On the other hand, if the control circuit still receives the out-of-synchronism signal (Yes in Operation S303), the control circuit 324 determines whether or not the current dispersion compensation amount is higher than the lower limit value of the dispersion compensation amount of the variable dispersion compensator 21-m (Operation S304). If the current dispersion compensation amount is higher than the lower limit value of the dispersion compensation amount of the variable dispersion compensator 21-m (Yes in Operation S304), the control circuit 324 returns the control to Operation S302 illustrated in FIG. 9. On the other hand, if the current dispersion compensation amount reaches the lower limit value of the dispersion compensation amount of the variable dispersion compensation 21-m (No in Operation S304), the control circuit 324 resets the dispersion compensation amount to the predetermined compensation amount stored in the memory (Operation S305).

After that, the control circuit 324 shifts the dispersion compensation amount in the positive direction from the current set value only by the prescribed amount (Operation S306). The control circuit 324 again determines whether or not the control circuit 324 receives the out-of-synchronism signal from the clock data reproducer 322 (Operation S307). If the control circuit 324 does not receive the out-of-synchronism signal (No in Operation S307), the control circuit 324 stores the current dispersion compensation amount as the corrected predetermined compensation amount (Operation S308). Then the control circuit 324 ends the adjusting processing of dispersion compensation amount.

On the other hand, if the control circuit 324 still receives the out-of-synchronism signal (Yes in Operation S307), the control circuit 324 returns the control to Operation S306 illustrated in FIG. 9. The control circuit 324 may repeat the processing of Operation S306 and Operation S307 illustrated in FIG. 9 until the control circuit 324 does not receive the out-of-synchronism signal.

If the residual chromatic dispersion is included in the range in which the clock data reproducer 322 may reproduce the clock signal, the control circuit 324 may determine the predetermined dispersion compensation amount of the variable dispersion compensator 21-m in such a way that the code error rate measured by the reproducer 312 of the reproduction unit 31 becomes low.

Figure 10:
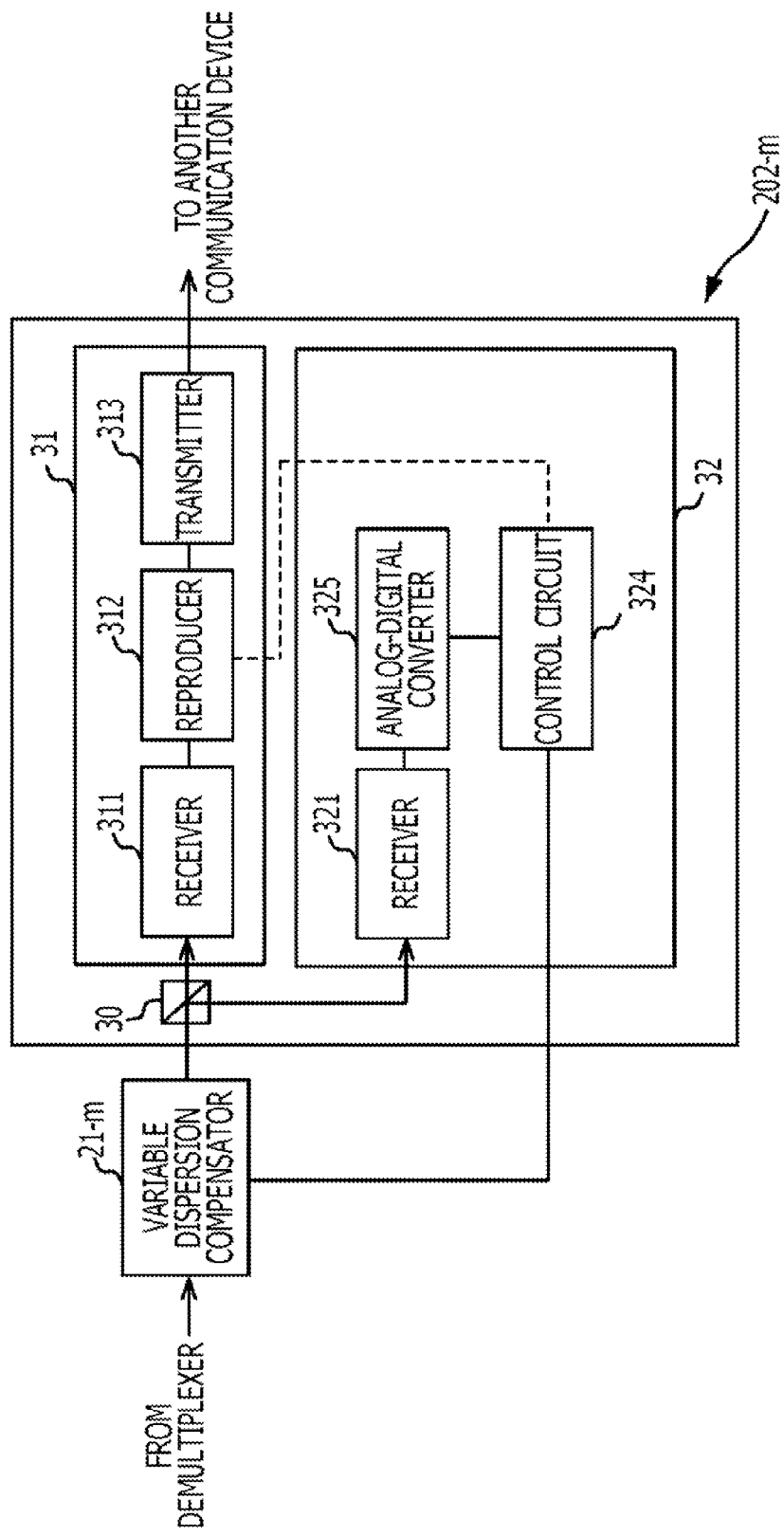
FIG. 10 is an overview configuration diagram of an exemplary receiving unit of a reception device according to another embodiment.

FIG. 10 is an overview configuration diagram of the exemplary receiving unit 202-m ($1 <$ or $=m<$ or $=k$) of the reception device 2 according to another embodiment. The components of the receiving unit 202-m illustrated in FIG. 10 are indicated with the same reference numerals as of the components of the receiving unit 20-m illustrated in FIG. 3. As illustrated in FIG. 10, the receiving unit 202-m is different from the receiving unit 20-m illustrated in FIG. 3 in that the monitor unit 32 includes an analog-digital converter 325 in place of the clock data reproducer 322 and the error detector 323. To control the variable dispersion compensator 21-m, the receiving unit 202-m uses the fact that the waveform of the electric signal output from the receiver 321 of the monitor unit 32 is deteriorated when the residual chromatic dispersion is not at a desired level.

Figure 11A:
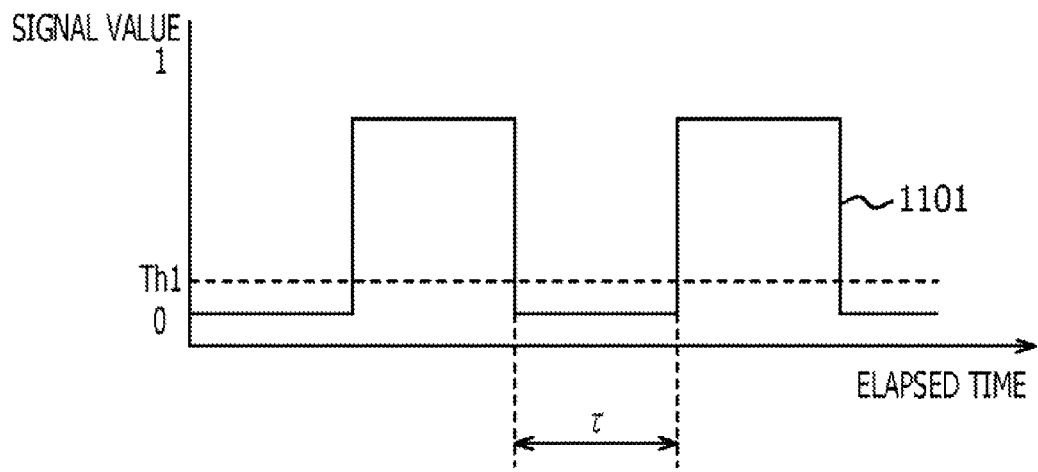
FIG. 11A is a schematic diagram of an exemplary electric signal that is converted from an optical signal where a waveform of an optical signal is not deteriorated by wavelength distortion of an optical transmission path.
Figure 11B:
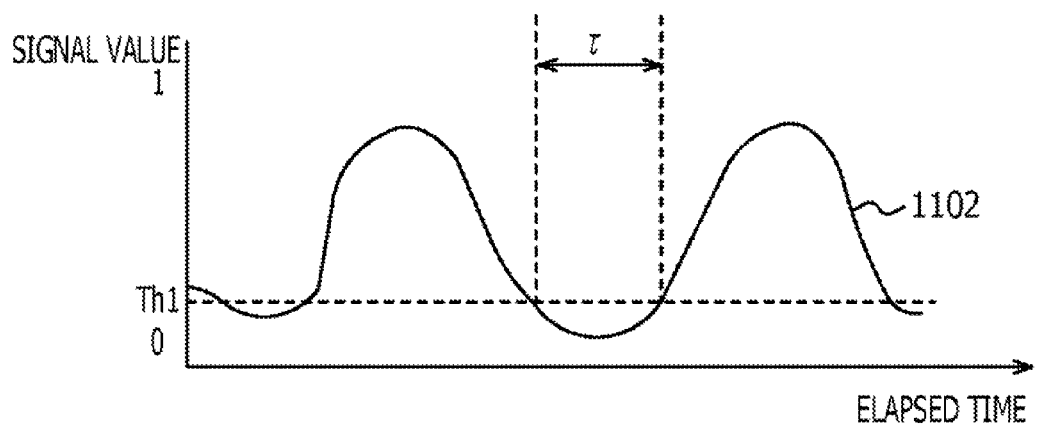
FIG. 11B is another schematic diagram of an exemplary electric signal that is converted from an optical signal where a waveform of an optical signal is deteriorated by wavelength distortion of an optical transmission path.

FIG. 11A is a schematic diagram of an electric signal 1101 that is converted from the optical signal by the receiver 321 if the waveform of the optical signal is not deteriorated by the chromatic dispersion. FIG. 11B is a schematic diagram of an electric signal 1102 that is converted from the optical signal by receiver 321 if the waveform of the optical signal is deteriorated by the chromatic dispersion. In FIG. 11A and FIG. 11B, the horizontal axis indicates an elapsed time, and the vertical axis indicates a signal value. As illustrated in FIG. 11A, if the waveform of the optical signal is not deteriorated by the chromatic dispersion, the electric signal 1101 has a sharp rising edge or a falling edge when the signal value changes from 0 to 1 or from 1 to 0. On the other hand, as illustrated in FIG. 11B, if the waveform of the optical signal is deteriorated by the chromatic dispersion, the electric signal 1102 changes gradually when the signal value changes from 0 to 1 or from 1 to 0. Accordingly, when the electric signals 1101 and 1102 have a smaller value than a prescribed threshold value Th1, a period t in which one signal value 0 continues in the electric signal 1102 is shorter than a period t in which one signal value 0 continues in the electric signal 1101. Accordingly, the monitor unit 32 of the receiving unit 202-m controls the dispersion compensation amount of the variable dispersion compensator 21-m based on a length of an electric signal corresponding to one signal value.

The analog-digital converter 325 converts the electric signal, which is output from the receiver 321, into a digital signal. The analog-digital converter 325 outputs the digital signal to the control circuit 324. As for the digital signal received from the analog-digital converter 325, the control circuit 324 measures a length of a period in which the digital signal corresponding to one signal value of the received optical signal continues. The length of the period in which the digital signal corresponding to one signal value is referred to as a signal duration period. For example, if the digital signal value corresponding to the signal value 0 of the optical signal modulated by the transmission device 1 is equal to or smaller than 1, the control circuit 324 measures the signal duration period in which the digital signal value is equal to or smaller than 1. If the signal duration period is shorter than a certain period, the control circuit 324 adjusts the dispersion compensation amount of the variable compensator 21-m until the signal duration period becomes equal to or longer than the certain period. If the waveform of the optical signal is not deteriorated by the chromatic dispersion, the certain period may be, for example, 50 to 70 percent of the signal duration period of the electric signal that is converted from the optical signal by the receiver 321.

According to the embodiment, the receiver 321 is designed in such a way that the sensitivity to the variation of the residual chromatic dispersion of the receiver 321 of the monitor unit 32 is higher than the sensitivity to the variation of the residual chromatic dispersion of the receiver 311 of the reproduction unit 31. Therefore, the monitor unit 32 may adjust the dispersion compensation amount of the variable dispersion compensator 21-m before the code error rate occurring when the reproducer 312 of the reproduction unit 31 reproduces the original signal increases.

FIG. 12 is an overview configuration diagram of the receiving unit 203-m (1< or =m< or =k) of the reception device 2 according to another embodiment. The components of the receiving unit 203-m illustrated in FIG. 12 are indicated with the same reference numerals as of the components of the receiving unit 20-m illustrated in FIG. 3. As illustrated in FIG. 12, the receiving unit 203-m is different from the receiving unit 20-m illustrated in FIG. 3 in that the fixed dispersion compensator 33 is located between the monitor unit 32 and the beam splitter 30.

As illustrated in FIG. 5, it is preferable that the residual chromatic dispersion in which the code error rate measured by the reproducer 312 of the reproduction unit 31 is low is equal to the residual chromatic dispersion in which the code error rate measured by the error detector 323 of the monitor unit 32 is low. In this case, the range of the residual chromatic dispersion in which the error detector 323 of the monitor unit 32 may measure the code error rate is completely included in the range of the residual chromatic dispersion in which the reproducer 312 of the reproduction unit 31 may measure the code error rate. Therefore, by controlling the variable dispersion compensator 21-m so that the residual chromatic dispersion is included in the range in which the error detector 323 may measure the code error rate, the control circuit 324 of the monitor unit 32 may reduce the increase of the code error rate when the reproduction unit 31 reproduces the original signal. However, chirp characteristics of the reproduction unit 31 may be different from the chirp characteristics of the monitor unit 32. In this case, the residual chromatic dispersion in which the code error rate measured by the reproducer 312 of the reproduction unit 31 is low may be different from the residual chromatic dispersion in which the code error rate measured by the error detector 323 of the monitor unit 32 is low. The receiving unit 203-m illustrated in FIG. 12 may compensate a difference between the chirp characteristics of the reproduction unit 31 and the chirp characteristics of the monitor unit 32 by allowing the optical signal branched to the monitor unit 32 by the beam splitter 30 to pass through the fixed dispersion compensator 33. The fixed dispersion compensator 33 may be, for example, an FBG that does not include an adjustment mechanism of the dispersion compensation amount or a chromatic dispersion compensation fiber.

In the receiving unit 203-m, the fixed dispersion compensator 33 may be located between the beam splitter 30 and the reproduction unit 31 instead of being located between the beam splitter 30 and the monitor unit 32. In this case, if the fixed dispersion compensator 33 compensates the chromatic dispersion with respect to the optical signal that is branched to the reproduction unit 31 by the beam splitter 30, the receiving unit 203-m may compensate the difference between the chirp characteristics of the reproduction unit 31 and the chirp characteristics of the monitor unit 32.

The monitor unit 32 of the receiving unit 203-m is not limited to the configuration illustrated in FIG. 3. For example, the monitor unit 32 of the receiving unit 203-m does not require the error detector as illustrated in FIG. 8. Alternatively, the monitor unit 32 of the receiving unit 203-m may include the same configuration as of the monitor unit 32 of the receiving unit 202-m illustrated in FIG. 10.

Figure 13:
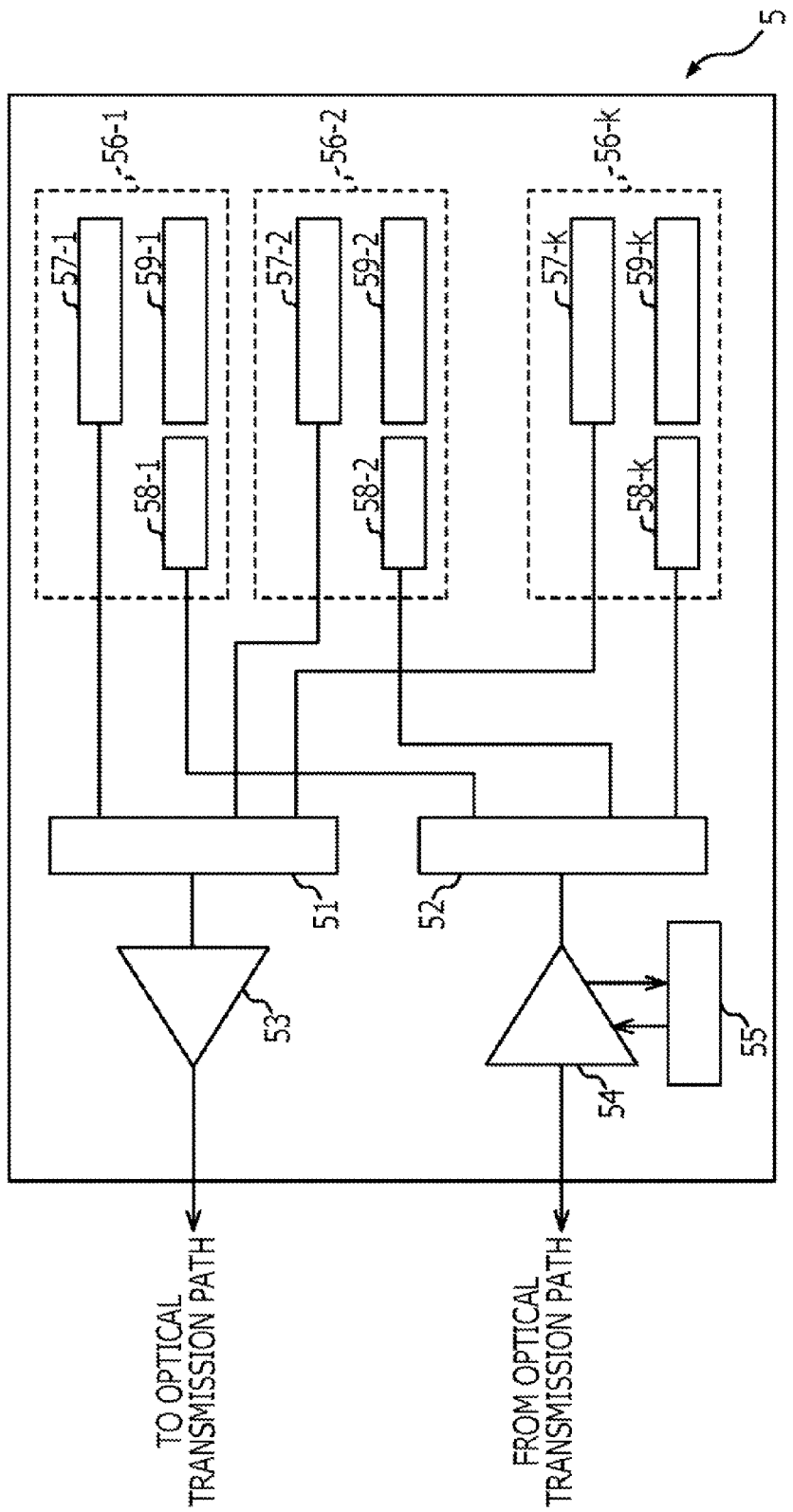
FIG. 13 is an overview configuration diagram of an exemplary optical transmission device that may perform a two-way communication according to another embodiment.

FIG. 13 is an overview configuration diagram of an exemplary optical transmission device 5 that may perform a WDM type two-way communication according to another embodiment. As illustrated in FIG. 13, the optical transmission device 5 includes a multiplexer 51, a demultiplexer 52, optical amplifiers 53 and 54, a fixed dispersion compensator 55, and a plurality of transmission and reception modules 56-1, 56-2, etc., and 56-k (k is an integer of two or more). Each transmission and reception module 56-m (1< or =m< or =k) includes a transmitting unit 57-m, a variable dispersion compensator 58-m, and a receiving unit 59-m. Moreover, the transmission and reception module 56-m is detachably attached to the optical transmission device 5. Accordingly, by increasing the number of the transmission and reception modules to be attached, the optical transmission device 5 may increase a communication amount of transmission and reception at the same time. A mechanism for detaching and attaching the transmission and reception module 56-m from/to the optical transmission device 5 may be, for example, any of various known mechanisms for detaching and attaching the transmission and reception module from/to the optical transmission device, so that detailed description of the mechanism is omitted.

As for transmission of the optical signal, in the optical transmission device 5, the transmitting unit 57-m of the transmission and reception module 56-m generates an optical signal of a single wavelength obtained by mapping the original signal to be transmitted to another optical transmission device (not illustrated) in a frame unit. The multiplexer 51 multiplexes the optical signals that have different wavelengths generated by the transmitting unit 57-m. The optical amplifier 53 amplifies the optical signal multiplexed by the multiplexer 51 and outputs the amplified optical signal to the optical transmission path.

The transmitting unit 57-m of the transmission and reception module 56-m may include the same function and configuration as of the transmitting unit 10-m of the transmission device 1 illustrated in FIG. 2. The multiplexer 51 and the optical amplifier 53 may include the same configuration as of the multiplexer 11 and the optical amplifier 12 of the transmission device 1 illustrated in FIG. 1, respectively.

On the other hand, as for reception of the optical signal, the optical transmission device 5 amplifies the multiplexed optical signal received from the optical transmission path by using the optical amplifier 54. As for the multiplexed optical signal, the optical transmission device 5 compensates the chromatic dispersion, which is generated on the optical transmission path, all at once by the fixed dispersion compensator 55. The demultiplexer 52 demultiplexes the multiplexed optical signal into an optical signal of a single wavelength. The variable dispersion compensator 58-m of the transmission and reception module 56-m compensates the residual chromatic dispersion with respect to the optical signal of a single wavelength, which is received through the optical transmission path and then is branched by the demultiplexer 52. The receiving unit 59-m of the transmission and reception module 56-m reproduces the transmitted original signal from the received optical signal of a single wavelength. Furthermore, the receiving unit 59-m controls the dispersion compensation amount of the corresponding variable dispersion compensator 58-m.

The variable dispersion compensator 58-m of the transmission and reception module 56-m may have the same function and configuration as of the variable dispersion compensator 21-m of the reception device 2 illustrated in FIG. 1. The receiving unit 59-m may be any of the receiving units illustrated in FIG. 3, FIG. 8, FIG. 10, or FIG. 12. According to the flowchart illustrated in FIG. 6, the receiving unit 59-m determines the predetermined value of the dispersion compensation amount of the corresponding variable dispersion compensator 58-m at the starting time of the transmission and reception module 56-m. During the communication, when there is a variation of the chromatic dispersion generated on the optical transmission path, the receiving unit 59-m adjusts the predetermined value of the dispersion compensation amount of the variable dispersion compensator 58-m by following the flowchart illustrated in FIG. 7 or FIG. 9.

The demultiplexer 52, the optical amplifier 54, and the fixed dispersion compensator 55 have the same configuration as the demultiplexer 22, the optical amplifier 23, and the fixed dispersion compensator 24 of the reception device 2 illustrated in FIG. 1, respectively.

According to another embodiment of the present invention, an optical transmission device that uses an optical signal of a single wavelength may be used. In this case, for example, in the optical transmission device, the multiplexer 51 and the demultiplexer 52 in the WDM type optical transmission device 5 illustrated in FIG. 13 are omitted. The optical transmission device may be a device that includes only a single transmission and reception module 56-1.

Furthermore, the optical transmission system and the optical transmission device applying the present invention are not limited to the system and device performing the communication in a communication speed of 10 Gbps, and may be, for example, the system and device performing the communication in a communication speed of 40 Gbps. The optical transmission system having the communication speed of 40 Gbps and the receiving unit of the optical transmission device may have the configurations illustrated in any of FIG. 3, FIG. 8, FIG. 10, and FIG. 12. Moreover, in the optical transmission device having the communication speed of 40 Gbps, the range of the residual chromatic dispersion in which the reproduction unit of the receiving unit may reproduce the original signal is, for example, ±100 psec/nm centering the predetermined residual chromatic dispersion. In this case, for example, the monitor unit may be designed in such a way that the range in which the monitor unit of the receiving unit may detect the frame is ±20 psec/nm centering the predetermined residual chromatic dispersion. As described above, those in the arts are able to make various changes according to the embodiments without departing from the sprit and scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment (s) of the present invention(s) has(have) been described in detail, it should be understood that the various changes, substitutions, and alterations could be made hereto without departing from the spirit and scope of the invention.

What is claimed is:
1. An optical transmission device comprising:
a variable dispersion compensator to compensate for chromatic dispersion of an optical transmission path transmitting an optical signal and to output the optical signal;
a branching unit to branch the optical signal output from the variable dispersion compensator onto a first light path and a second light path;
a reproduction unit to receive the optical signal transmitted on the first light path and to reproduce a first electric signal from the optical signal transmitted on the first light path and;
a monitor unit, having a higher sensitivity to a variation of the chromatic dispersion than the sensitivity to the variation of the chromatic dispersion of the reproduction unit, to receive the optical signal transmitted on the second light path, perform a reproducing process to reproduce a second electric signal from the optical signal transmitted on the second light path, produce one of a clock signal from the second electric signal or an out-of-synchronism signal indicating that the clock signal may not be produced from the second electric signal, and control the variable dispersion compensator based on the clock signal or the out-of-synchronism signal.

2. The optical transmission device according to claim 1, wherein a frequency range in which the the monitor unit may produce the clock signal is narrower than a frequency range of the second electric signal.

3. The optical transmission device according to claim 1, wherein the monitor unit is further configured to:

produce a data signal from the second electric signal, determine whether or not a signal frame may be detected from the data signal and output the out-of-synchronism signal when the signal frame may not be detected.

4. The optical transmission device according to claim 3, wherein the monitor unit is further configured to:

measure, when it is determined that signal frame may be detected from the data signal, a code error rate of the reproduced data signal and output the code error rate, and further control the variable dispersion compensator based on one of the code error rate, the clock signal, or the out-of-synchronism signal.

5. An optical transmission device comprising:

a variable dispersion compensator to compensate for chromatic dispersion of an optical transmission path transmitting an optical signal and to output the optical signal;

a branching unit to branch the optical signal output from the variable dispersion compensator onto a first light path and a second light path;

a reproduction unit to receive the optical signal transmitted on the first light path and to reproduce a first electric signal from the optical signal transmitted on the first light path and;

a monitor unit, having a higher sensitivity to a variation of the chromatic dispersion than the sensitivity to the variation of the chromatic dispersion of the reproduction unit, to receive the optical signal transmitted on the second light path, perform a reproducing process to reproduce a second electric signal from the optical signal transmitted on the second light path, convert the second electric signal into a digital signal, and control a dispersion compensation amount of the variable dispersion compensator when a signal duration period in which the digital signal corresponding to a single signal value of the optical signal is shorter than a prescribed threshold value, wherein a range of a residual chromatic dispersion in which the signal duration period is longer than the prescribed threshold value is narrower than a range of the residual chromatic dispersion in which the reproduction unit may reproduce the digital signal.

6. The optical transmission device according to claim 4, further comprising:

a fixed dispersion compensator located between the branching unit and the monitor unit and configured to compensate for chromatic dispersion with respect to the optical signal transmitted on the second light path in such a way that a residual chromatic dispersion, in which the code error rate measured by the reproduction unit is low, is equal to a residual chromatic dispersion, in which the code error rate measured by the monitor unit is low.

7. The optical transmission device according to claim 4, further comprising:

a fixed dispersion compensator located between the branching unit and the reproduction unit and configured to compensate for chromatic dispersion with respect to the optical signal transmitted on the first light path in such a way that residual chromatic dispersion, in which the code error rate measured by the reproduction unit is low, is equal to a residual chromatic dispersion of, in which the code error rate measured by the monitor unit is low.

* * * * *